(12) United States Patent
Campbell

(10) Patent No.: US 11,697,971 B2
(45) Date of Patent: Jul. 11, 2023

(54) MULTIPLE TAPERED THREADED CONNECTION

(71) Applicant: COMPLETE GROUP TECHNOLOGIES LTD., Leduc (CA)

(72) Inventor: Steven Lee Campbell, Leduc (CA)

(73) Assignee: Complete Group Technologies Ltd., Leduc (CA)

( * ) Notice: Subject to any disclaimer, the term of this patent is extended or adjusted under 35 U.S.C. 154(b) by 221 days.

(21) Appl. No.: 16/762,467

(22) PCT Filed: Nov. 6, 2018

(86) PCT No.: PCT/CA2018/051401
§ 371 (c)(1),
(2) Date: May 7, 2020

(87) PCT Pub. No.: WO2019/090419
PCT Pub. Date: May 16, 2019

(65) Prior Publication Data
US 2021/0254413 A1  Aug. 19, 2021

(30) Foreign Application Priority Data

Nov. 7, 2017 (CA) .............................. CA 2984826
Jul. 10, 2018 (CA) .............................. CA 3010955

(51) Int. Cl.
*F16L 15/06* (2006.01)
*E21B 17/042* (2006.01)
*F16L 15/00* (2006.01)

(52) U.S. Cl.
CPC ........ *E21B 17/0423* (2013.01); *F16L 15/002* (2013.01); *F16L 15/06* (2013.01)

(58) Field of Classification Search
CPC ...... F16L 15/002; F16L 15/06; E21B 17/0423
See application file for complete search history.

(56) References Cited

U.S. PATENT DOCUMENTS

| 2,587,544 | A | * | 2/1952 | Sneddon | F16L 15/002 285/391 |
| 3,079,181 | A | * | 2/1963 | Van Der Wissel | E21B 17/042 285/333 |
| 3,994,516 | A | * | 11/1976 | Fredd | E21B 17/0423 285/392 |
| 4,121,862 | A | * | 10/1978 | Greer | F16L 15/001 285/333 |
| 4,537,429 | A | | 8/1985 | Landriault | |
| 4,568,113 | A | * | 2/1986 | Axford | F16L 15/008 285/55 |

(Continued)

FOREIGN PATENT DOCUMENTS

CN  1265445 A  9/2000
CN  1443290 A  9/2003
(Continued)

*Primary Examiner* — David Bochna
(74) *Attorney, Agent, or Firm* — McCarthy Tétrault LLP

(57) ABSTRACT

A threaded connection between adjacent drill string components comprises a threaded female connection end adapted to receive a correspondingly threaded male connection end, the two ends each having first and second portions of different tapers. Tubular members, drill string tools and other drill string components comprising the female or male ends described herein are also provided.

22 Claims, 23 Drawing Sheets

(56) References Cited

U.S. PATENT DOCUMENTS

| | | | |
|---|---|---|---|
| 4,588,213 A * | 5/1986 | Bollfrass | F16L 15/04 285/333 |
| 4,688,832 A | 8/1987 | Ortloff et al. | |
| 4,750,761 A | 6/1988 | Watts | |
| 4,770,448 A * | 9/1988 | Strickland | E21B 17/042 285/333 |
| 5,048,871 A | 9/1991 | Pfeiffer et al. | |
| 5,411,301 A * | 5/1995 | Moyer | E21B 17/042 285/55 |
| 5,826,921 A | 10/1998 | Woolley | |
| 5,908,212 A | 6/1999 | Smith et al. | |
| 6,494,499 B1 | 12/2002 | Galle et al. | |
| 6,752,436 B1 | 6/2004 | Verdillon | |
| 2002/0158469 A1 | 10/2002 | Mannella et al. | |
| 2004/0195835 A1 | 10/2004 | Noel et al. | |
| 2008/0012322 A1 | 1/2008 | Reynolds, Jr. | |
| 2009/0058085 A1 | 3/2009 | Breihan et al. | |
| 2010/0123311 A1 | 5/2010 | Church | |
| 2011/0133449 A1 | 6/2011 | Mazzaferro et al. | |
| 2011/0220369 A1 * | 9/2011 | DeLange | E21B 17/042 166/382 |
| 2012/0037427 A1 | 2/2012 | Kinsella | |
| 2014/0183862 A1 | 7/2014 | Angelle et al. | |
| 2015/0316181 A1 * | 11/2015 | Tejeda | F16L 15/06 285/66 |
| 2016/0160575 A1 * | 6/2016 | Hou | F16L 15/002 285/334 |
| 2019/0128075 A1 * | 5/2019 | Urech | F16L 15/06 |
| 2021/0033136 A1 * | 2/2021 | Garcha | F16L 5/06 |

FOREIGN PATENT DOCUMENTS

| | | |
|---|---|---|
| CN | 101881139 A | 11/2010 |
| CN | 102224368 A | 10/2011 |
| CN | 203322000 U | 12/2013 |
| CN | 104074473 A | 10/2014 |
| CO | 03002760 | 1/2003 |
| CO | 04120536 | 11/2004 |
| CO | 13054592 | 3/2013 |
| CO | 13294565 | 12/2013 |
| EP | 0220274 A1 | 5/1987 |
| EP | 3128119 A1 | 2/2017 |
| JP | 2002349775 A | 12/2002 |
| WO | 8606456 A1 | 11/1986 |
| WO | WO-2019111803 A1 * | 6/2019 ........... E21B 17/042 |

* cited by examiner

MULTIPLE TAPERED THREADED CONNECTION

CROSS REFERENCE TO PRIOR APPLICATIONS

The present application claims priority under the Paris Convention to Canadian Application Number 2,984,826, filed Nov. 17, 2017, and Canadian Application Number 3,010,955, filed Jul. 10, 2018, the entire contents of which are incorporated herein by reference.

FIELD OF THE DISCLOSURE

The present description relates generally to threaded connections in drill string components, such as drilling tubulars and downhole tools. More specifically, the description relates to multiple tapered threaded connections provided on drilling tubulars and other drill string (or downhole) tools.

BACKGROUND

This section provides background information to facilitate a better understanding of the various aspects of the invention. It should be understood that the statements in this section of this document are to be read in this light, and not as admissions of prior art.

In oil and gas drilling a drill bit is generally threadably attached to the end of a drill stem and rotated in order to form a borehole. A drill stem is traditionally comprised of a variety of sub-assemblies and tubulars such as the Bottom Hole Assembly (BHA), Heavy Weight Drill Pipe (HWDP) and drill pipe. The BHA may include a variety of downhole tools and tubulars such as a rotary steerable tool, a mud motor, Measurement-While-Drilling (MWD) tools, Logging-While-Drilling (LWD) tools, a configuration of stabilizers, reamers, jars, shocks, agitators, and multiple drill collars among other modern drilling technologies. Connected to the BHA is a configuration of drilling tubulars including HWDP and drill pipe which couple the drill bit and BHA back to the surface completing the drill string and affording for surface rotation, compression and tension to be applied to the drill bit in advancing the borehole. Having a sufficiently hollow inside diameter the assembled drill string also functions as a conduit for pumping drilling fluid through the drill string to clean the borehole, provide hydraulic power to downhole tools and provide cooling of heat generated by the drill bit or downhole tools. It is common that all of these drill string tubulars and sub-assemblies are threadably attached to one another to allow for sequential assembly of the drill string at surface as the borehole is advanced further. This then also allows for the sequential disassembly of the drill string upon reaching the target borehole depth or if the need to service downhole components arises and the drill string must be tripped out and removed from the borehole and subsequently reassembled to be tripped back in after servicing the necessary downhole components on surface. In addition to tubular members, a drill string may also comprise one or more tools connected to adjacent tubular members or to other tools. Examples of such tools making up a drill string include drill collars, motors (such as mud motors), jar tools (for freeing stuck pipe), joints (for connecting tubulars and/or tools to each other), stabilizers, subs (short pipe joints), shock subs, reamers etc. Various other drill pipe tools will be known to persons skilled in the art. It will also be understood that each of these tools, like the tubulars, have opposing ends that are adapted to be connected to adjacent tubular members or other tools to form the drill string. For the purpose of the present description, the term "drill string components" will be understood to mean tubular members or other tools that are used to form a drill string.

During drilling operations it is desirable that all of the aforementioned threaded connections between adjacent drill string tubulars possess sufficient mechanical capabilities to withstand the loads placed on them during drilling operations (e.g. torsional, tensile, compressive loads). Traditionally these threaded connections have been known as rotary shouldered connections and have a taper between 1.25 to 3 inches per foot, a given threadform and a single torque bearing shoulder. Modern variants of rotary shouldered connections have introduced a secondary torque bearing shoulder on the nose of the pin connection which contacts the rear of the box connection when the pin connection is threadably engaged with the box connection.

To maximize the torsional capability of the rotary shouldered connection the taper of modern connections may range from 0.50 to 1.00 inches per foot as described in U.S. Pat. No. 5,908,212.

The largest issue with low taper thick walled connections have been difficulties in the handling and threading together of adjoining drilling tubulars. Due to the low taper, the male connection end does not stab deep into the female connection end. This results in many revolutions of the male connection end to fully engage into the female connection end. This adds undesirable time to the threading process on surface which is costly, and typically results in increased damage to the threads and a high repair cost.

It is desirable that a rotary shouldered connection provide the necessary mechanical strength capabilities during drilling operations and effective handling characteristics during assembly and disassembly of the drill string tubulars and subassemblies.

In attempts to provide such a rotary shouldered connection a double or triple step/start thread design on low taper connections have been used. The issue with this type of connection is that the male connection end stabs on a pair of thread flanks instead of on multiple thread flanks. These connections are equally difficult to manufacture and dimensionally control, leading to high repair and service cost. These multi step/start threads have also exhibited poor ability to hold torsional energy and often back-off and unthread with relatively low amounts of reverse torque applied. These connections have ultimately been phased out of common usage in the industry.

BRIEF SUMMARY

There is provided a multiple tapered threaded connection having a longitudinal axis. A female connection end has internal threads. The internal threads have a first end, a second end, a first portion and a second portion. The first portion of the internal thread is adjacent the first end of the internal thread and has a first taper. The second portion of the internal thread is adjacent the second end of the internal thread and has a second taper that is different from the first taper. A male connection end has external threads. The external threads have a first end, a second end, a first portion and a second portion. The first portion and the second portion of the male connection correspond to the first portion and the second portion of the female connection. The first portion of the external threads is adjacent the first end of the external threads and has a first taper corresponding to the first taper of the female connection. The second portion of the external threads is adjacent the second end of the external threads and has a second taper that corresponds to the second taper of the female connection.

In one embodiment, the second taper is steeper than the first taper. The first taper may have a taper of 0.75 inches per foot and the second taper may have a taper of 2 inches per foot to the longitudinal axis.

In one embodiment, the first taper is steeper than the second taper.

In one embodiment, transitional threads are provided between the first taper and the second taper for creating a continuous thread. The transitional threads may be shorter in height than the internal threads of the female connection end and the external threads of the male connection end. This can help to prevent excessive damage to the threads during stabbing operations.

In one embodiment, the male connection end includes a male external shoulder configured to engage a female external shoulder on a mating female connection end when the male connection end is threadably engaged with the female connection end.

In a further embodiment, the male connection end includes a male external shoulder configured to engage a female external shoulder on a mating female connection end and a male internal shoulder axially spaced from the male external shoulder configured to engage a female internal shoulder on the female connector end axially spaced from the female external shoulder when the male connection end is threadably engaged with the female connection end.

In one embodiment, each thread within the first portion of the internal threads and the first portion of the external threads includes a crest, a root, a load flank extending between the crest and the root and a stab flank extending between the crest and the root. Each thread within the second portion of the internal threads and the second portion of the external threads includes a crest, a root, a load flank extending between the crest and the root and a stab flank extending between the crest and the root. The stab flank on the internal threads is more proximate the female connection end external shoulder. The load flank on the external threads is more proximate the male connection end external shoulder.

In one embodiment each thread within the first portion of the internal threads and the first portion of the external threads includes a crest, a root, a load flank extending between the crest and the root and a stab flank extending between the crest and the root. Each thread within the second portion of the internal threads and the second portion of the external threads includes a crest, a root, a load flank extending between the crest and the root and a stab flank extending between the crest and the root. The stab flank on the internal threads is more proximate the female connection end external shoulder. The load flank on the external threads is more proximate the male connection end external shoulder. The thread crest, root, load flank and stab flank of threads within the first portion of the internal and external thread correspond to the thread crest, root, load flank and stab flank of the threads within the second portion of the internal and external thread.

There is also provided a multiple tapered threaded connection. A female connection end has internal threads. The internal threads have a first end, a second end, a first portion with a first taper, a second portion with a second taper and a third portion with a third taper. The first portion is adjacent the first end of the internal threads. The second portion is adjacent to the first portion. The third portion is adjacent to the second portion and the second end of the internal threads. The taper of adjacent portions are different from each other. A male connection end has external threads. The external threads have a first end, a second end, a first portion with a first taper, a second portion with a second taper and a third portion with a third taper. The first portion is adjacent the first end of the external threads. The second portion is adjacent to the first portion. The third portion is adjacent to the second portion and the second end of the external threads. Each of the first taper, the second taper and the third taper correspond to the first taper, the second taper and the third taper of the female connection.

In one embodiment, transitional threads are provided between the first taper and the second taper and between the second taper and the third taper for creating a continuous thread. The transitional threads may be shorter in height than the internal threads of the female connection end and the external threads of the male connection end. This can help to prevent excessive damage to the threads during stabbing operations.

In one embodiment, the first taper is steeper than the second taper and the second taper is steeper than the third taper.

In one embodiment, the third taper is steeper than the second taper and the second taper is steeper than the first taper.

In one embodiment, the first taper and the third taper are the same and the first taper and the third taper are steeper than the second taper.

In one embodiment, the first taper and the third taper are the same and the second taper is steeper than the first taper and the third taper.

In one embodiment, the first taper is steeper than the third taper and the third taper is steeper than the second taper.

In one embodiment, the third taper is steeper than the first taper and the first taper is steeper than the second taper.

In one embodiment, the second taper is steeper than the first taper and the first taper is steeper than the third taper.

In one embodiment, the second taper is steeper than the third taper and the third taper is steeper than the first taper.

There is also provided a multiple tapered threaded connection. A female connection end has internal threads. The internal threads have a first end, a second end and at least three portions. Each of the at least three portions have a taper such that the taper of adjacent portions are different from each other. A male connection end has external threads. The external threads have a first end, a second end and at least three portions corresponding to the at least three portions of the female connection. Each of the at least three portions have a taper corresponding to the taper of the at least three portions of the female connection. The taper of adjacent portions are different from each other.

In one embodiment, transitional threads are provided between the at least three portions for creating a continuous thread. The transitional threads may be shorter in height than the internal threads of the female connection end and the external threads of the male connection end. This can help to prevent excessive damage to the threads during stabbing operations.

There is also provided a multiple tapered threaded connection. A female connection end has internal threads. The internal threads have a first end, a second end and at least two portions. Each of the at least two portions has a taper such that the taper of adjacent portions are different from each other. A male connection end has external threads. The external threads have a first end, a second end and at least two portions. Each of the at least two portions having a taper such that the taper of adjacent portions are different from each other. At least a portion of at least one portion of the internal threads of the female connection end corresponds to at least a portion of at least one portion of the external threads of the male connection end such that a threaded connection is made between the at least one portion of the internal threads and the at least one portion of the external threads.

In one embodiment, the internal threads of the female connection end have two portions and the external threads of the male connection end have three portions. At least a portion of at least one of the two portions of the internal threads corresponds to at least a portion of at least one of the three portions of the external threads.

In another embodiment, the internal threads of the female connection end have three portions and the external threads of the male connection end have two portions. At least a portion of at least one of the two portions of the external threads corresponds to at least a portion of at least one of the three portions of the internal threads.

In one embodiment, transitional threads are provided between the at least two portions for creating a continuous thread. The transitional threads may be shorter in height than the internal threads of the female connection end and the external threads of the male connection end. This can help to prevent excessive damage to the threads during stabbing operations.

Thus, in one aspect, there is provided a threaded connection between two drill string components, such as tubular members or drill string tools, the connection comprising:
  a female connector provided on a first end of a first drill string component and a male connector provided on a first end of a second drill string component, the female connector being adapted to receive the male connector to form the connection;
  the female connector having a first portion located proximal to the first end of the first drill string component and a second portion located away from the first end and within the lumen of the first drill string component, the female connector having at least one internal thread;
  the male connector having a first portion located away from the first end of the second drill string component and a second portion located proximal to the first end of the second drill string component, the male connector having at least one external thread, wherein, once connected, the first portion of the male connector is adjacent the first portion of the female connector;
  the at least one external thread being adapted to cooperate with the at least one internal thread;
  the first portion of the female connector having a first taper and the first portion of the male connector having a corresponding first taper; and,
  the second portion of the female connector having a second taper different from the first taper and the second portion of the male connector having a corresponding second taper.

In another aspect, there is provided a threaded connection between two drill string components, such as tubular members or drill string tools, the connection comprising:
  a female connector provided on a first end of a first drill string component and a male connector provided on a first end of a second drill string component, the female connector being adapted to receive the male connector to form the connection;
  the female connector having a first portion located proximal to the first end of the first drill string component and a second portion located away from the first end and within the lumen of the first drill string component, the female connector having at least one internal thread;
  the male connector having a first portion located away from the first end of the second drill string component and a second portion located proximal to the first end of the second drill string component, the male connector having at least one external thread, wherein, once connected, the first portion of the male connector is adjacent the first portion of the female connector;
  the at least one external thread being adapted to cooperate with the at least one internal thread;
  the first portion of the female connector having a first taper and the first portion of the male connector having a corresponding first taper;
  the second portion of the female connector having a second taper and the second portion of the male connector having a corresponding second taper; and,
  at least one of the female connector or the male connector having a third portion located between the first portion and second portion thereof and wherein the third portion has a third taper that is different from the first and second tapers of the adjacent first and second portions.

In another aspect, there is provided a drill string component, such as a tubular member or a drill string tool, having a female connector provided on a first end thereof, the female connector being adapted to receive a corresponding male connector provided on another drill string component, the female connector having:
  a first portion located proximal to the first end of the drill string component;
  a second portion located away from the first end and within the lumen of the drill string component;
  at least one thread provided on the first and second portions, wherein the at least one thread is an internal thread;
  the first portion of the female connector having a first taper; and
  the second portion of the female connector having a second taper, wherein the second taper is different from the first taper.

In a further aspect, there is provided a drill string component, such as a tubular member or a drill string tool, having a male connector provided on a first end thereof, the male connector being adapted to receive a corresponding female connector provided on another drill string component, the male connector having:
  a first portion located away from the first end of the drill string component;
  a second portion located proximal to the first end of the drill string component;
  at least one thread provided on the first and second portions, wherein the at least one thread is an external thread;
  the first portion of the male connector having a first taper; and,
  the second portion of the male connector having a second taper different from the first taper.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
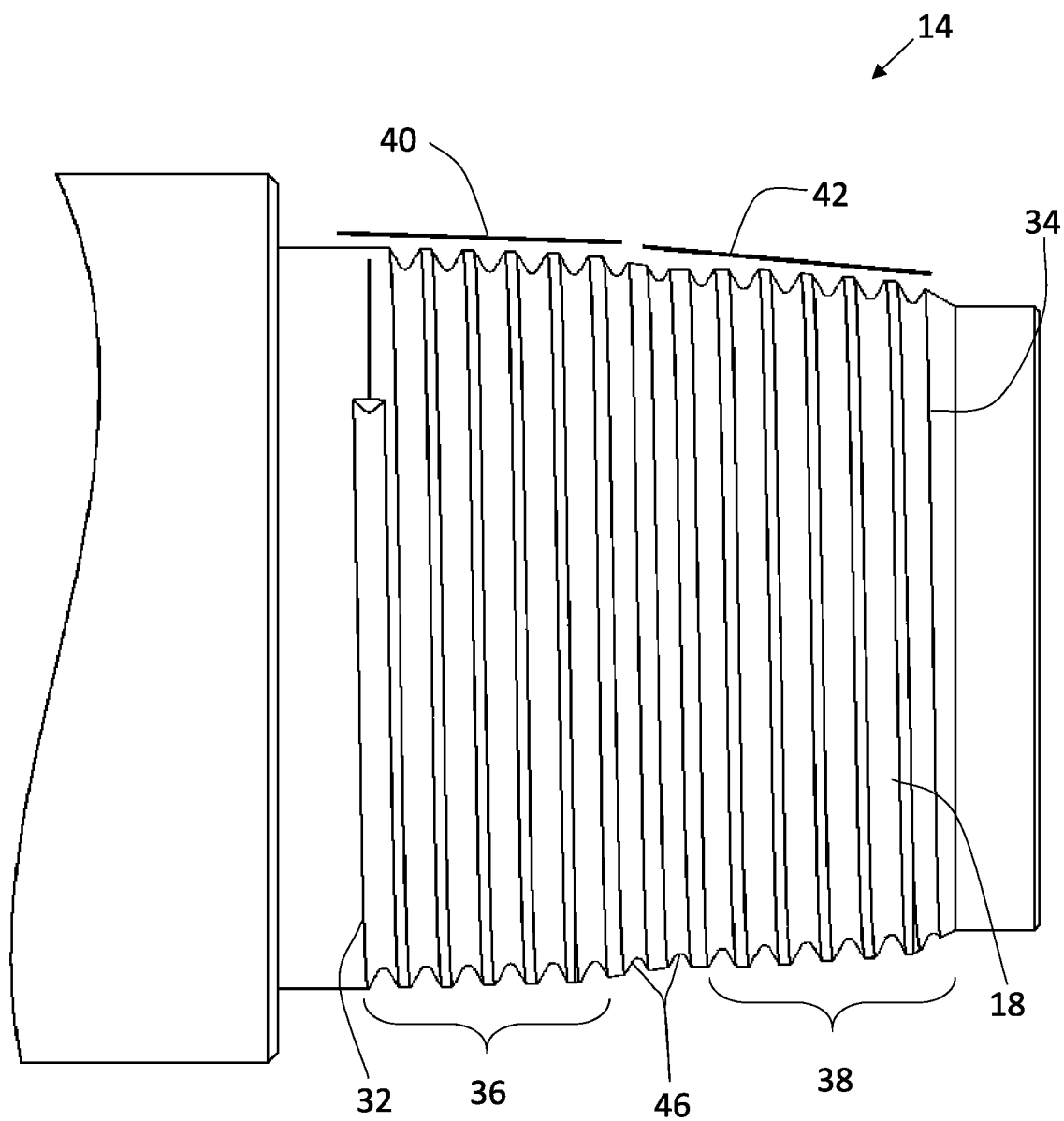
FIG. 1 is a side elevation view of a male connection end having a multiple tapered profile according to an aspect of the description.

As used herein, the term "taper" refers to a change in diameter over a given length and may be expressed in various units of measurement and methods. In the context of the present description, a taper is provided along at least a portion of an elongate member, such as a drill string tubular.

The units of measurement and methods of describing tapers as used herein are not meant to limit the scope of the invention and should be interpreted in the broadest sense possible. For instance, a taper of 2 inches per foot would be equivalent to roughly 0.1667 (or, generally, 0.17) inches per inch and would also be equivalent to 1 radial inch per foot or a half angle taper of 4.7636 (or, generally, 4.76 or 4.8) degrees from the longitudinal axis. As would be known to persons skilled in the art, a taper that is measured in, for example, inches per foot, refers to the change in diameter of the surface of the tapered portion about the longitudinal axis of the elongate member or an axis parallel to the longitudinal axis.

In the present description, tapers may be described in a relative sense using the term "different". It will be understood that such term is intended to indicate a variation or change in a given taper. In one example, a taper may be characterized as being "different" from another taper if it comprises a variation of approximately 0.1" or more per foot.

Tapers may also be described herein with the relative terms "steeper" or "shallower". In particular, these terms are intended to characterize the angle of the taper, or portion of the taper, with respect to the longitudinal axis of the elongate member on which the taper is provided. It will be understood that a taper may be characterized as "steep" if it forms more of an angle with the longitudinal axis than a taper that forms a lesser angle with the longitudinal axis, with the opposite being the case for a "shallow" taper.

The phrase "multiple taper" as used herein is intended to refer to a taper that includes a difference in steepness along its length. That is, a taper having one portion that is steeper than another portion will be referred to as a multiple taper.

The term "adjacent" as used herein is intended to be non-limiting and should be construed to mean "neighboring" or "nearest in physical proximity", and should not be construed to require physical contact.

The terms "male connection" and "female connection" should be interpreted equivalent to "pin connection" and "box connection", respectively, as these terms are known in the art. Thus, a pin or male connection end comprises a portion at one end of a tubular having a threaded external surface. Similarly, a box or female connection end comprises a portion at one end of a tubular having a threaded internal surface.

Any references herein to "top" or "bottom" are made for purposes of clarity and should not be interpreted to imply any direction relative to a borehole or other external frames of reference.

Any references herein to sequencing, such as "first", "second", "third" etc., are made solely for the purpose of facilitating the description of relative locations and relationships between features and should not be interpreted to imply any particular ordering, capability, priority or physical location of features relative to a borehole or other external frames of reference.

As would be understood by persons skilled in art, the use herein of the term "stub" or "stubbed" generally describes a thread form that has been manufactured with a truncated thread form height but is otherwise accurate to said thread form.

The use of the term "correspond" or "corresponding" when describing a relationship between male and female connection features should be interpreted as indicating that the features being described are substantially compatible and complementary but not necessarily identical in terms of location, diameter, length, taper or thread form. Thus, as would be understood by persons skilled in the art, a male threaded element will be referred to one that "corresponds" to a given female threaded portion if the two elements can be connected to each other in a threaded manner.

A tapered threaded connection, as defined herein, is formed by a first longitudinal member having a female connection end that is threadably connected to a male connection end of another longitudinal member. Thus, a multiple tapered threaded connection is formed by a multiple tapered female connection end that is threadably connected to a multiple tapered male connection end. Such multiple tapered connection, including a multiple tapered male end and a multiple tapered female end, is described herein and illustrated in the accompanying figures. It will be understood that, for the purposes of the present description, the term "longitudinal member" may refer to a drill string tubular or a coupling used to connect to at least one drill string tubular forming a drill string. It will be appreciated that the connection described herein may be used for any connection between tubular members or for any connection between tubular members and other tools etc. that form a drill string.

Figure 4:
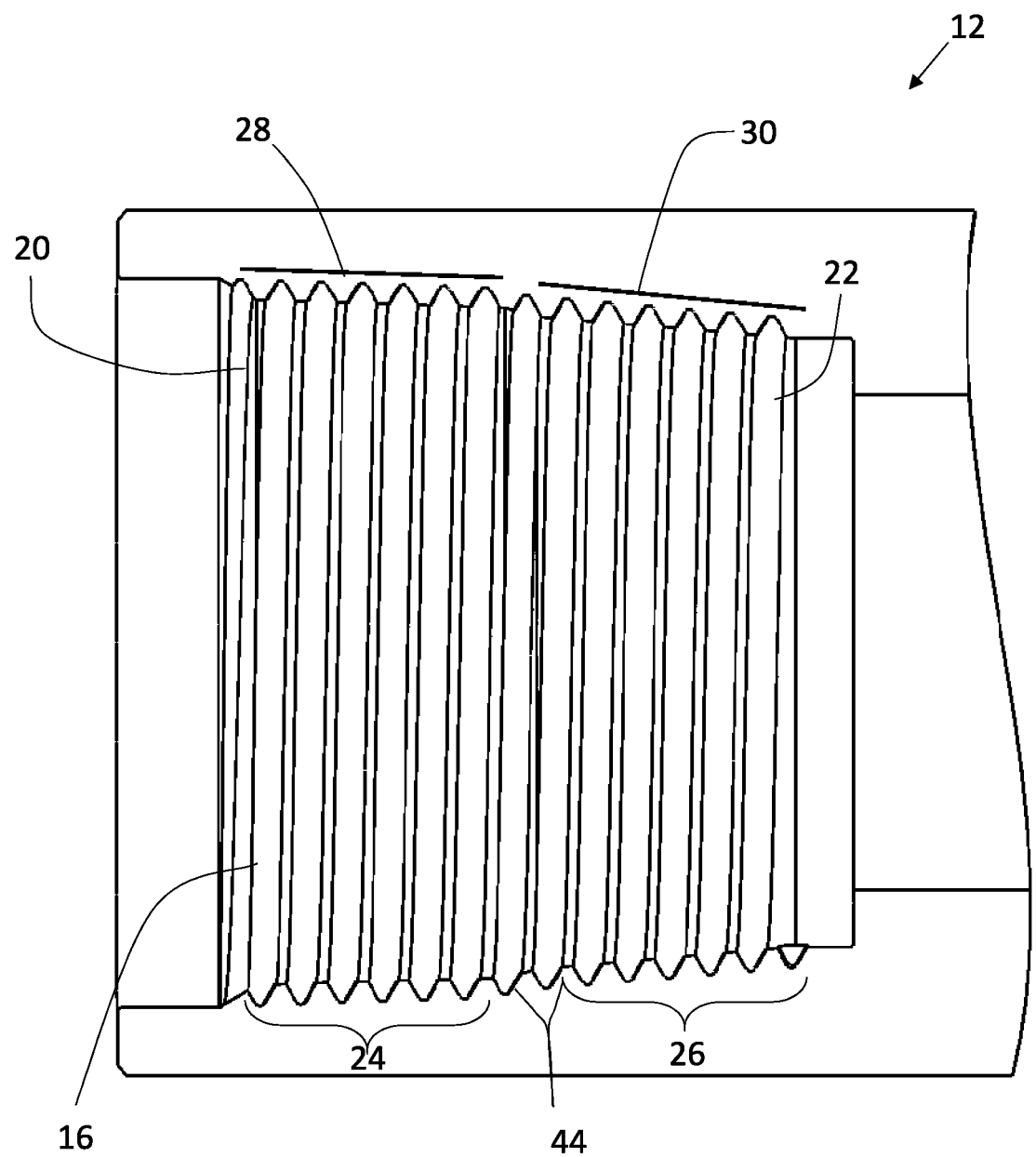
FIG. 4 is a side cross-sectional view of a female connection end according to an aspect of the description.
Figure 5:
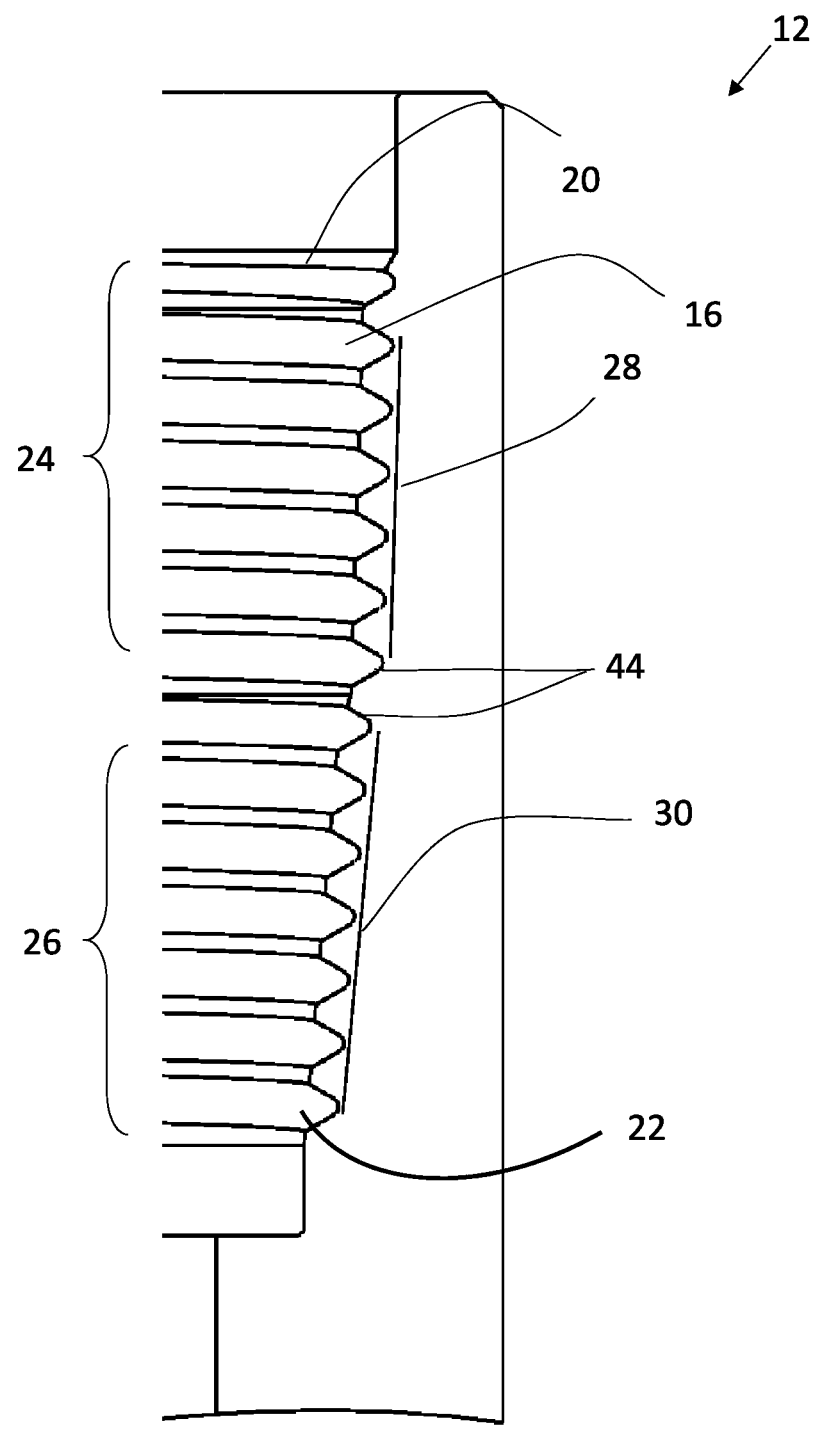
FIG. 5 is a partial side cross-sectional view of the female connection end of FIG. 4.
Figure 6:
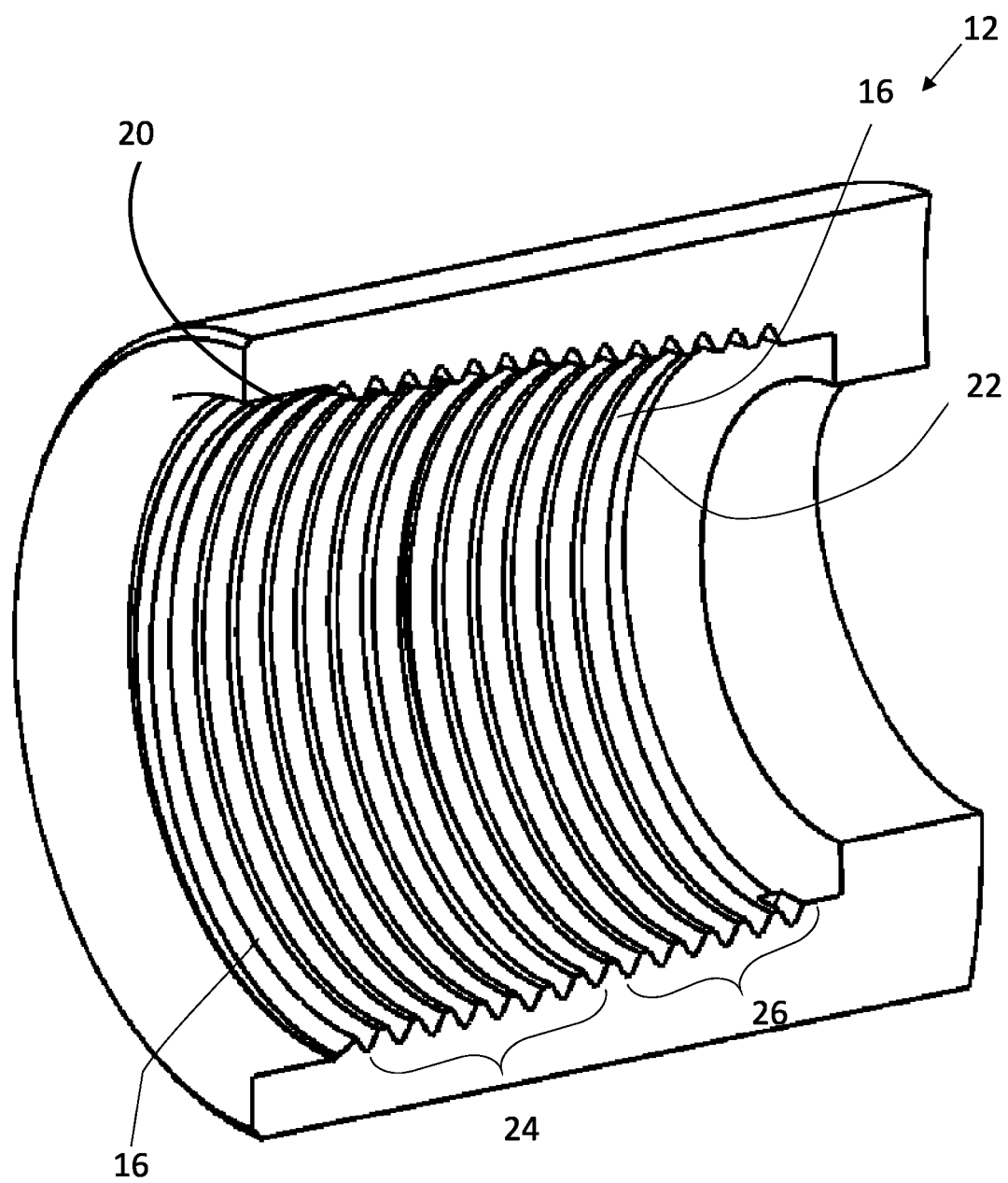
FIG. 6 is a perspective cross-sectional view of the female connection end shown in FIG. 4.
Figure 7:
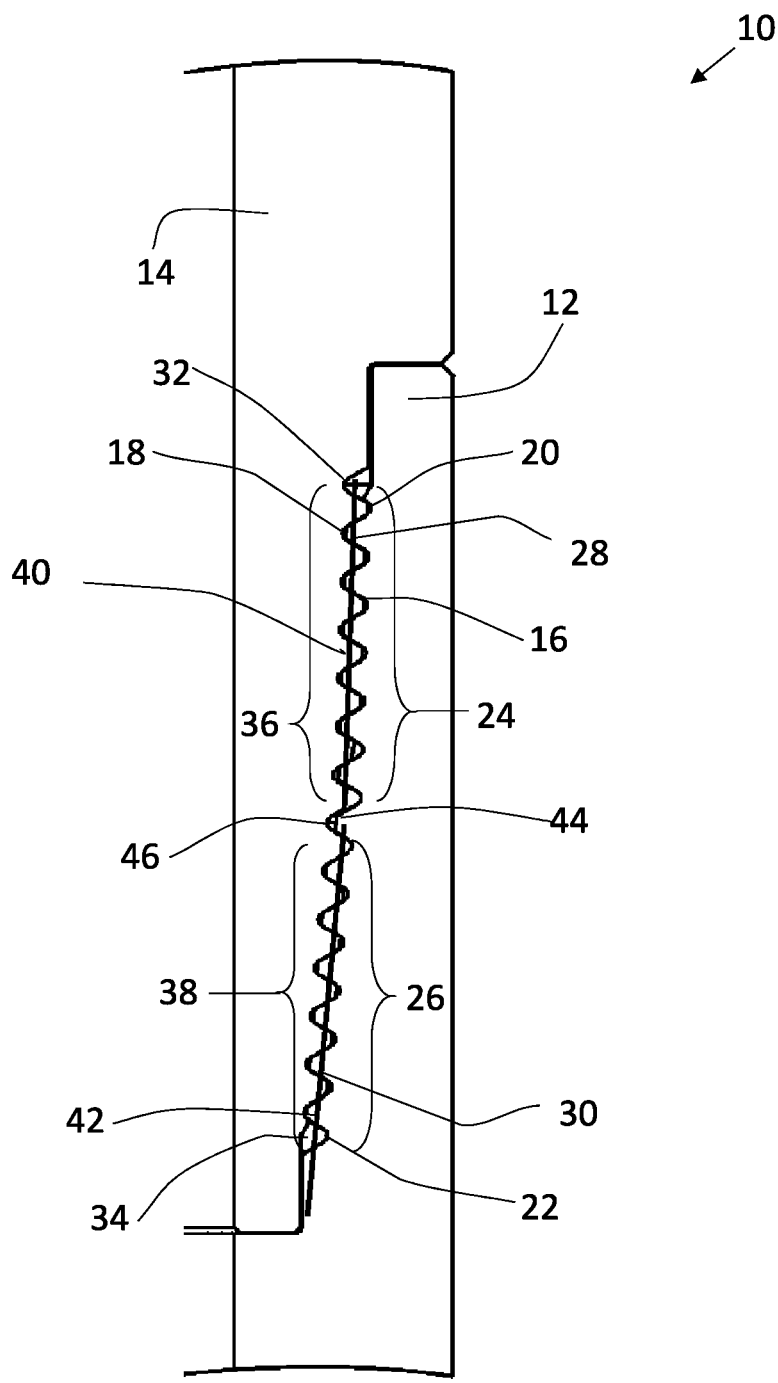
FIG. 7 is a partial side cross-sectional view of a multiple tapered threaded connection comprising the male connection end of FIG. 1 in combination with the corresponding female connection end of FIG. 4.

Referring first to FIG. 7, a multiple tapered threaded connection 10 is formed from a female connection, or "box" end 12, provided at an end of a first longitudinal member and a male connection, or "pin" end 14, provided at an end of a second longitudinal member. Referring to FIGS. 4 through 6, the female connection end 12 has internal threads 16.

Referring to FIG. 1, the male connection end 14 has external threads 18 that correspond to internal threads 16 of the female connection end 12, shown in FIG. 4.

Referring to FIG. 5, internal thread 16 has a first or "top" end 20, a second or "bottom" end 22, a first portion 24 and a second portion 26. The first portion 24 of the internal thread 16 is located proximal to the first end 20 of internal thread 16 and has a first taper, shown at 28. Second portion 26 of the internal thread 16 is located proximal to the second end 22 of the internal thread 16 and has a second taper, shown at 30. In this way, the female or box connection end 12 is provided with a female end or box profile.

In FIG. 5, the first portion 24 and the second portion 26 are illustrated as being of substantially the same length; however, it will be understood by persons skilled in the art that first portion 24 and second portion 26 may also be of different lengths.

Figure 8:
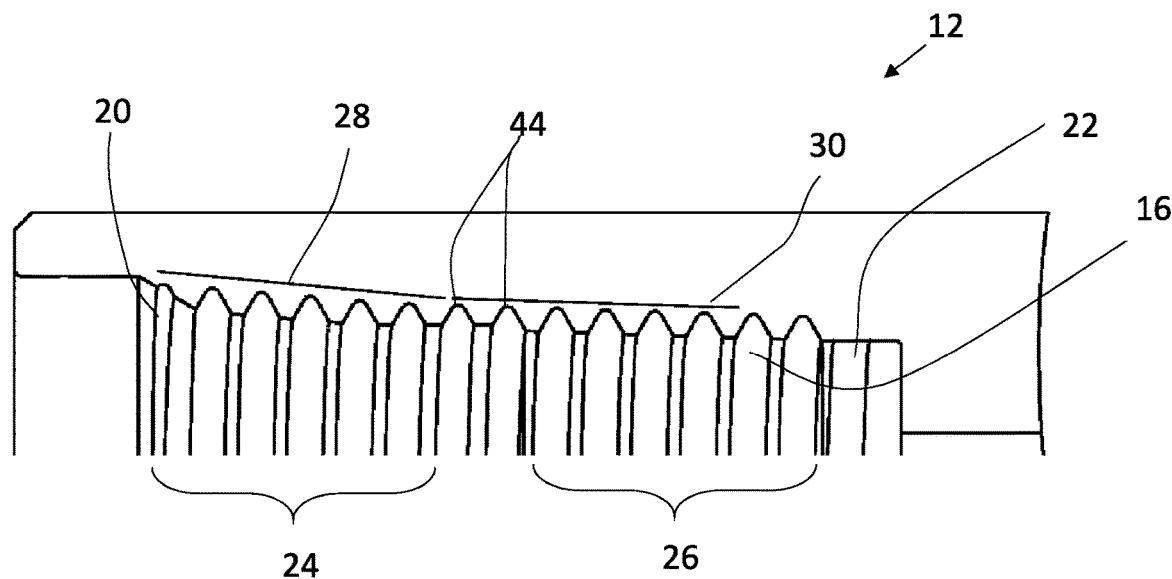
FIG. 8 is a partial side cross-sectional view of a female connection end according to another aspect.
Figure 10:
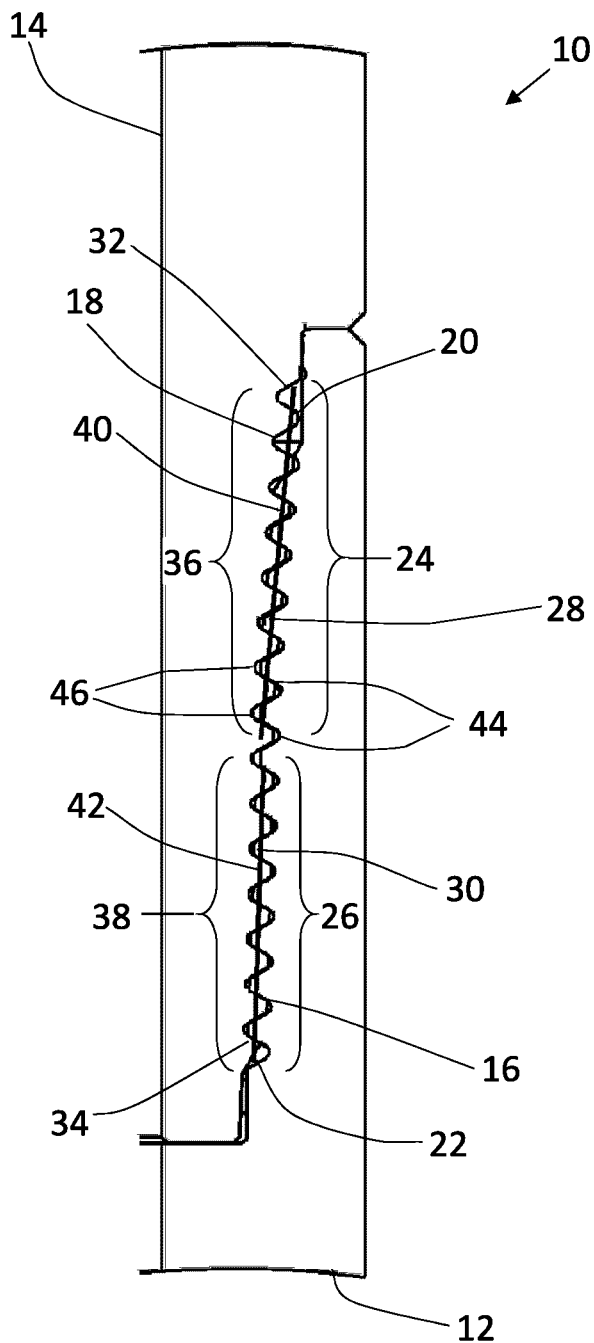
FIG. 10 is a partial side cross-sectional view of a multiple tapered threaded connection comprising the male connection end of FIG. 9 in combination with the corresponding female connection end of FIG. 8.

In FIGS. 4 through 6, the second taper 30 of the internal thread 16 is illustrated as being steeper than first taper 28. However, according to other aspects of the description, such as illustrated in FIGS. 8 and 10, the first taper 28 may be steeper than second taper 30. In either case, by providing different tapers in the thread, the stress distribution within the connection may be altered in a desirable fashion. In this regard, the effect of the taper angle on stress distribution was discussed above. This feature of the present description is also discussed further below.

Figure 3:
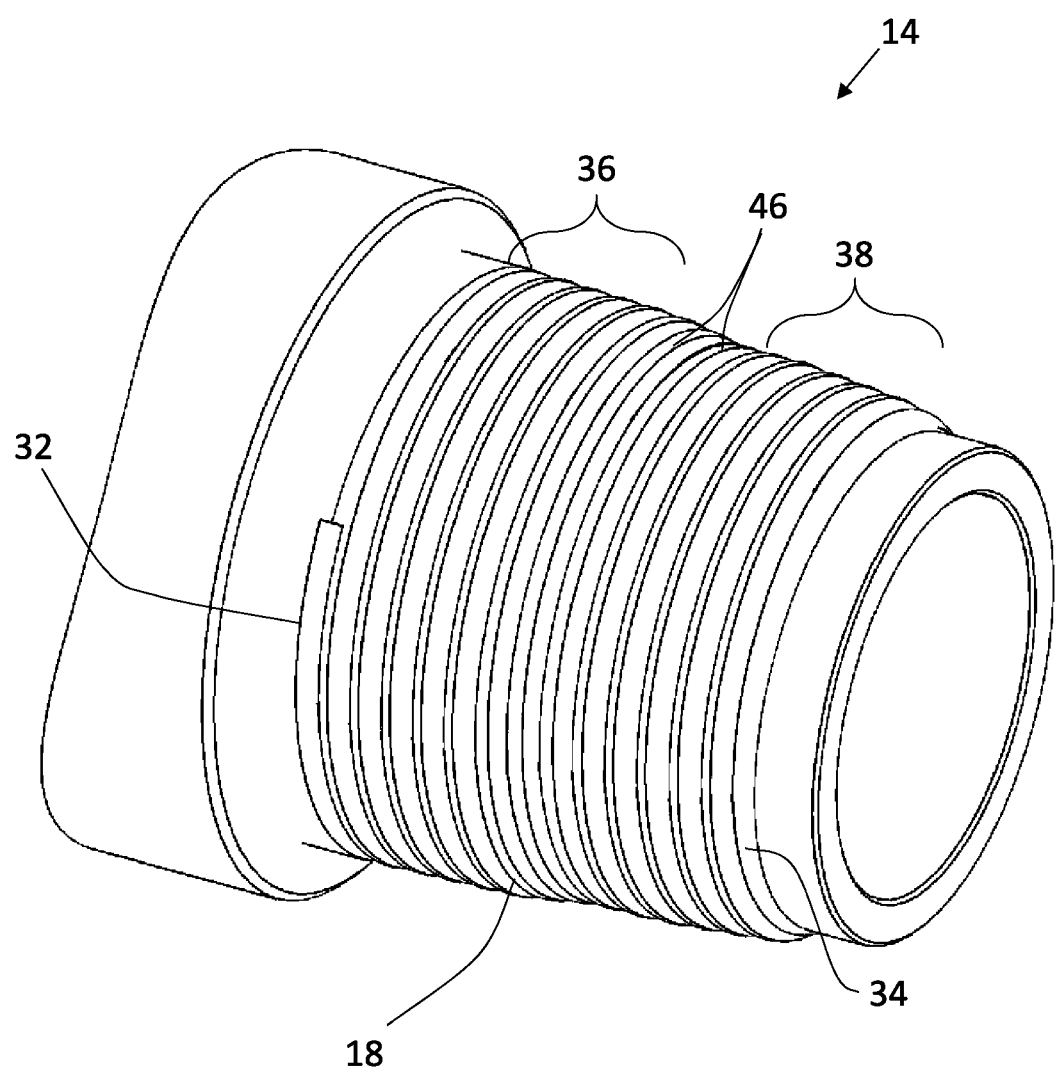
FIG. 3 is a perspective view of the male connection end shown in FIG. 1.

Referring to FIG. 3, a male connection end 14 of the present description has an external thread 18 having a first end 32, a second end 34, a first portion 36 and a second portion 38. When connected to a female connection end, first portion 36 and second portion 38 of male connection end 14 are positioned so as to correspond, respectively, with first portion 24 and second portion 26 of the female connection end 12, as illustrated in FIG. 7. Referring to FIG. 1, the first portion 36 of the male connection end 14 is located proximal to the first end 32 of external thread 18 and has a first taper shown at 40. Similarly, the second portion 38 of the male connection end 14 is located proximal to the second end 34 of external thread 18 and has a second taper 42. In this way, the male or pin connection end 14 is provided with a male end or pin profile. As will be understood, in order for the pin end to engage the box end, the pin profile will correspond at least generally to the box profile. Thus, for forming a connection between the pin an box ends, threads 16 and 18 would be adapted to correspond with, and thereby threadably engage each other, the first taper 28 of the box end would correspond with the first taper 40 of the pin end, and the second taper 30 of the box end would correspond with the second taper 42 of the pin end.

In FIG. 3, first portion 36 and second portion 38 are illustrated as being substantially the same length; however, it will be understood by persons skilled in the art that first portion 36 and second portion 38 may also be of different lengths.

Figure 2:
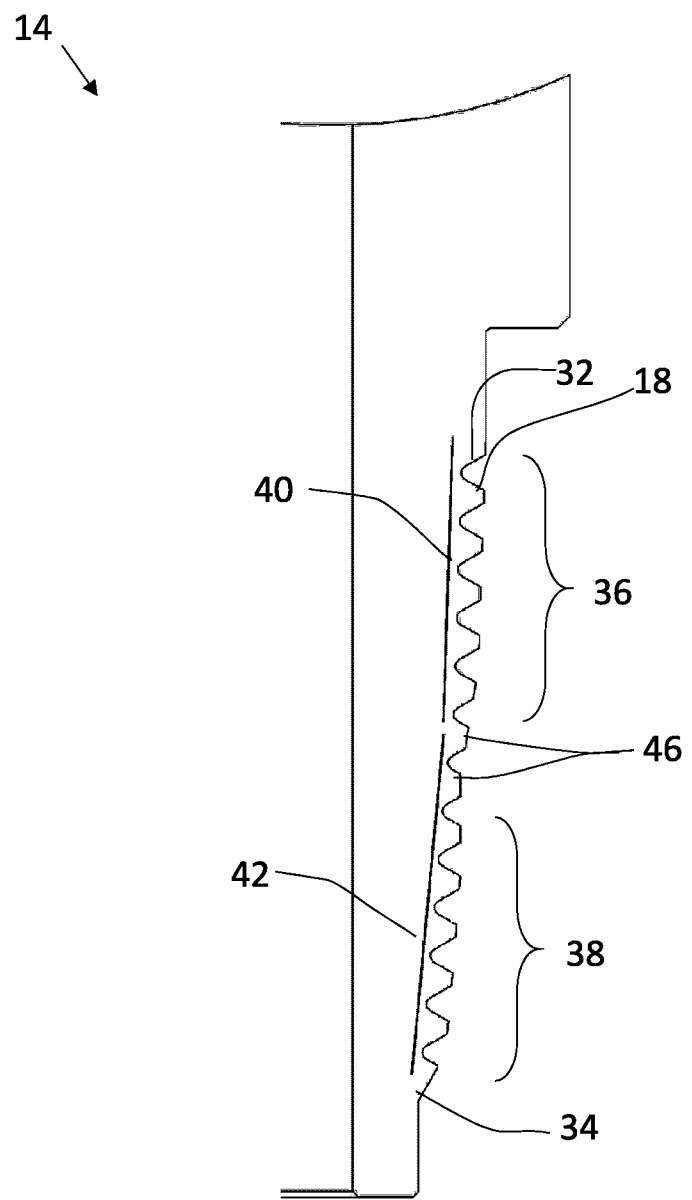
FIG. 2 is a partial side cross-sectional view of the male connection end shown in FIG. 1.
Figure 9:
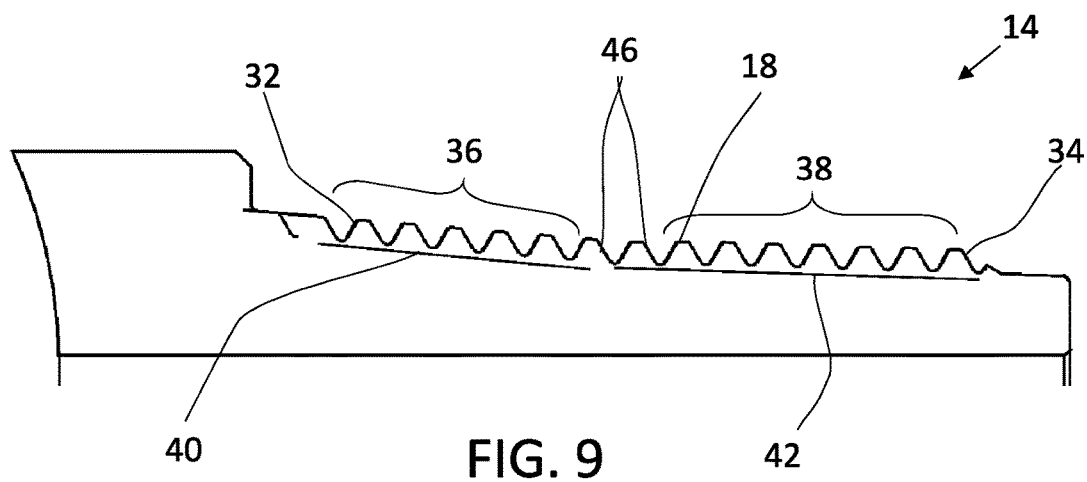
FIG. 9 is a partial side cross-sectional view of a male connection end according to another aspect.

In FIGS. 1 through 3, second taper 42 is illustrated as being steeper than first taper 40. However, according to other aspects, such as illustrated in FIGS. 9 and 10, the first taper 40 may be steeper than second taper 42. As discussed above, by providing different tapers, the stress distribution within the connection may be altered in a desirable fashion.

As shown in FIG. 7, first tapers 28 and 40 of the box and pin ends, respectively, create a connection 10 that is thick-walled in both the pin and box portions. As would be understood, such an arrangement would serve to maximize torque capability of the connection in higher stressed regions of connections. As also shown in FIG. 7, according to the illustrated aspect of the description, the second tapers 30 and 42 of the box and pin ends, respectively, comprise steeper tapers, which permit deep stabbing in lower stressed regions of connections 10. Such an arrangement allows for a quick make-up and reduces damage without compromising the overall torque carrying capabilities of the connections 10.

According to one aspect, and as shown in FIGS. 1-7, the first tapers 28 and 40 may have a taper of 0.75 inches per foot while the second tapers 30 and 42 may have a steeper taper of 2 inches per foot. In another aspect, the first tapers may be 0.75 inches per foot while the second tapers are 1.5 inches per foot. Other tapers for both the first and second tapers are encompassed by the present description. Generally, in one aspect, the ratio of the second tapers to the first tapers is from about 2:1 to about 3:1. This range includes the ratios 2.0:1, 2.1:1, 2.2:1, 2.3:1, 2.4:1, 2.5:1, 2.6:1, 2.7:1, 2.8:1, 2.9:1, and 3.0:1. The steeper taper of second tapers 30 and 42 allows for deeper stabbing of male connection end 14 into female connection end 12 while the shallower taper of first tapers 28 and 40 allows for a thicker wall for each of male connection end 14 and female connection end 12. As discussed further below, in other aspects, the present description encompasses situations where one of the first or second taper has a taper of 0 inches per foot, that is, no taper.

Referring to FIG. 5, a transitional thread 44 may optionally be provided as a junction between the thread of first taper 28 and the thread of the second taper 30 of internal thread 16. In this way, the thread 16 is continuous. In one aspect, the transitional thread 44 may comprise between two and four thread rotations; however, it will be understood by persons skilled in the art that more or fewer transitional thread rotations may be used. The number of rotations of the transitional thread 44 can, for example, vary based upon the diameter of the connection, the connection length, and/or the pitch of the threads.

Referring to FIG. 2, and in a similar manner as discussed above, a transitional thread 46 may also be provided on the pin end, so as to form a junction between the threads of first taper 40 and second taper 42 of external thread 18, so as to result in the external thread being continuous. The transitional thread 46 of external thread 18 of the pin end may optionally be designed to cooperate with the transitional thread 44 of the internal thread 16 of the box end. However, in other aspects of the present description, the transitional threads 44 and 46 may be independent of each other with no engagement there-between.

Generally, transitional thread 46 may comprise two to four thread rotations; however, it will be understood by persons skilled in the art that more or fewer transitional thread rotations may be provided. The number of rotations of the transitional thread 46 can vary based upon the diameter of the connection, the connection length and/or the pitch of the threads.

Figure 11:
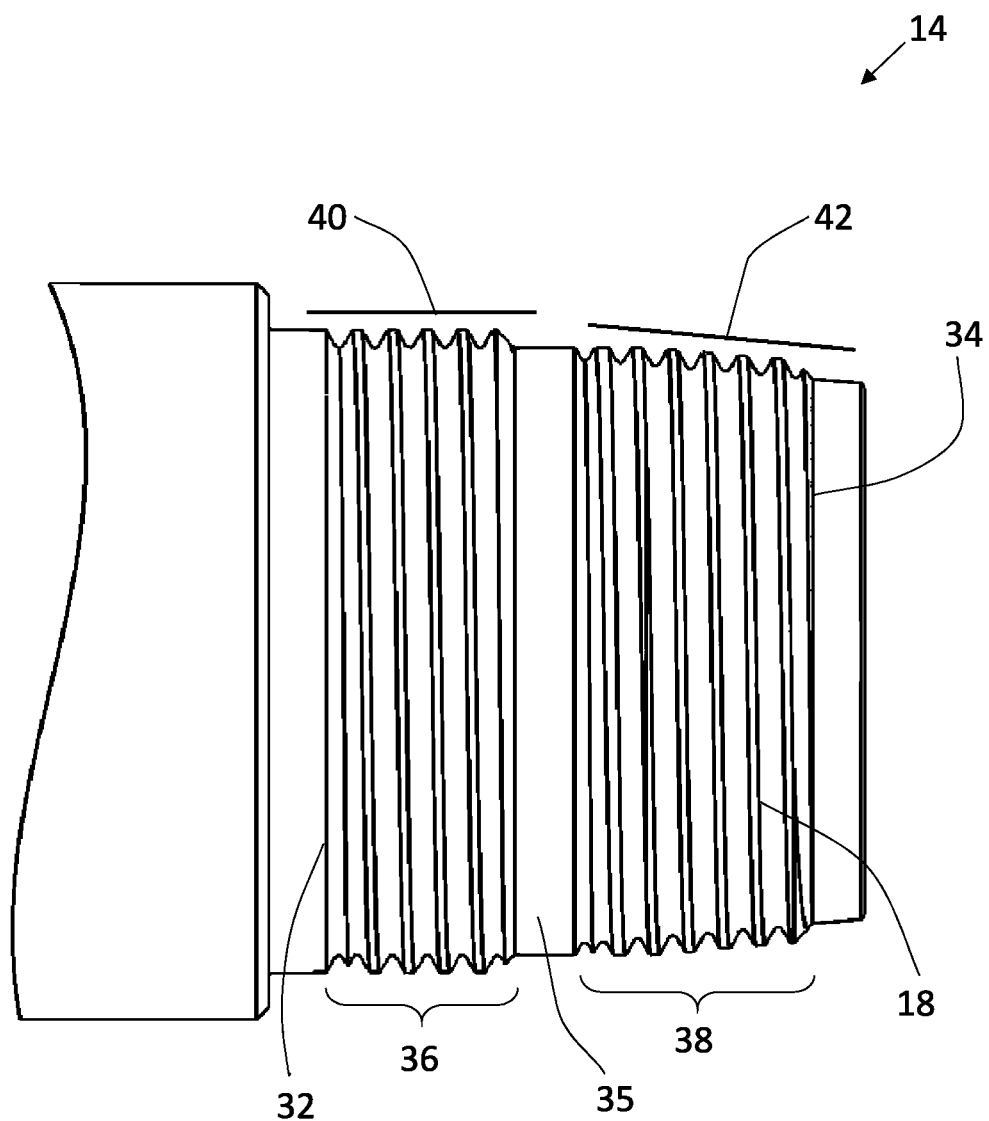
FIG. 11 is a side elevation view of a male connection end having a multiple tapered threaded profile, according to another aspect.
Figure 12:
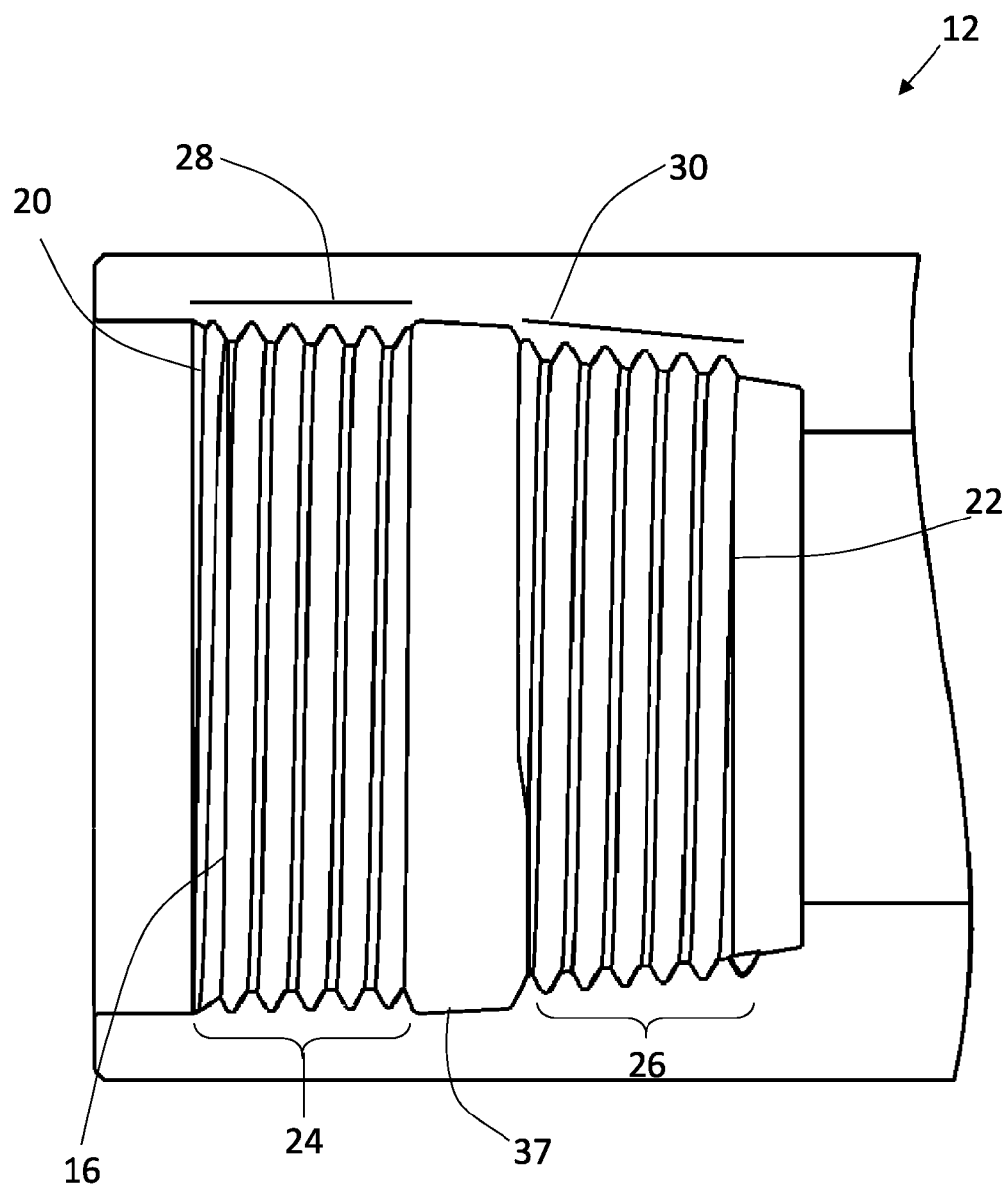
FIG. 12 is a side cross-sectional view of a female connection end having a multiple tapered threaded profile, according to another aspect.

Referring to FIGS. 11 and 12, another aspect of the description is illustrated. As shown in FIG. 11, the first portion 36, with first taper 40, and the second portion 38, with second taper 42, of external thread 18 of pin end 14 may optionally be spaced apart from each other by a relatively blank space or spacer segment 35. As will be understood, where a spacer segment 35 is included, the thread 18 would not be continuous. The size or length of the spacer segment 35 may vary. Referring to FIG. 12, first portion 24, with first taper 28, and second portion 26 with second taper 30, of internal thread 16 of box end 12 may be similarly spaced apart from each other by a spacer segment 37, thereby resulting in internal thread 16 being discontinuous. As described above, the size of spacer segment 37 may also vary. In one aspect, the profiles of the pin and box ends may be sized to correspond with each other. As will be understood, the spacer segments 35 and 37 are provided as an alternative to the transitional threads discussed above. It will also be understood that in some aspects one of the pin and box may include a transitional thread while the other of the pin and box may include a spacer segment.

FIG. 11 illustrates another optional aspect of the present description, wherein the first taper 40 of the pin end 14 has a taper of zero inches per foot, or in other words no taper, whereas the second taper 42 is greater than zero. As will be understood, the profile of the cooperating box end shown in FIG. 12 would have a complementary profile, wherein the first taper 28 of the box end 12 has a taper of zero inches per foot and the second taper 30 is complementary to the second taper 42 of the pin end 14. In one aspect, the second taper 42 of the pin end 14 and the second taper 30 of the box end may each have a taper of two inches per foot. It will, however, be appreciated by persons skilled in the art that the second tapers 42 and 30 may have any value. Similarly, it will be appreciated that the first tapers 40 and 28 may also have any value.

Referring to FIG. 7 and FIG. 10, another optional aspect of the description is illustrated, wherein the transitional threads 44 and 46, of the box and pin ends, respectively, are stubbed or shortened in height. In the result, and according to this optional aspect, the transitional threads 44 and 46 are made shorter in height than the remainder of the internal thread 16 and external thread 18, respectively. Since it is expected that the transitional threads 44 and 46 would generally bear the brunt of damage during the stabbing procedure, by stubbing the threads, it is possible to restrict such damage and thereby mitigate damage to internal thread 16 and external thread 18.

Another aspect of the multiple tapered threaded connection, generally identified by reference numeral 100, will now be described with reference to FIGS. 13 to 23.

Figure 13:
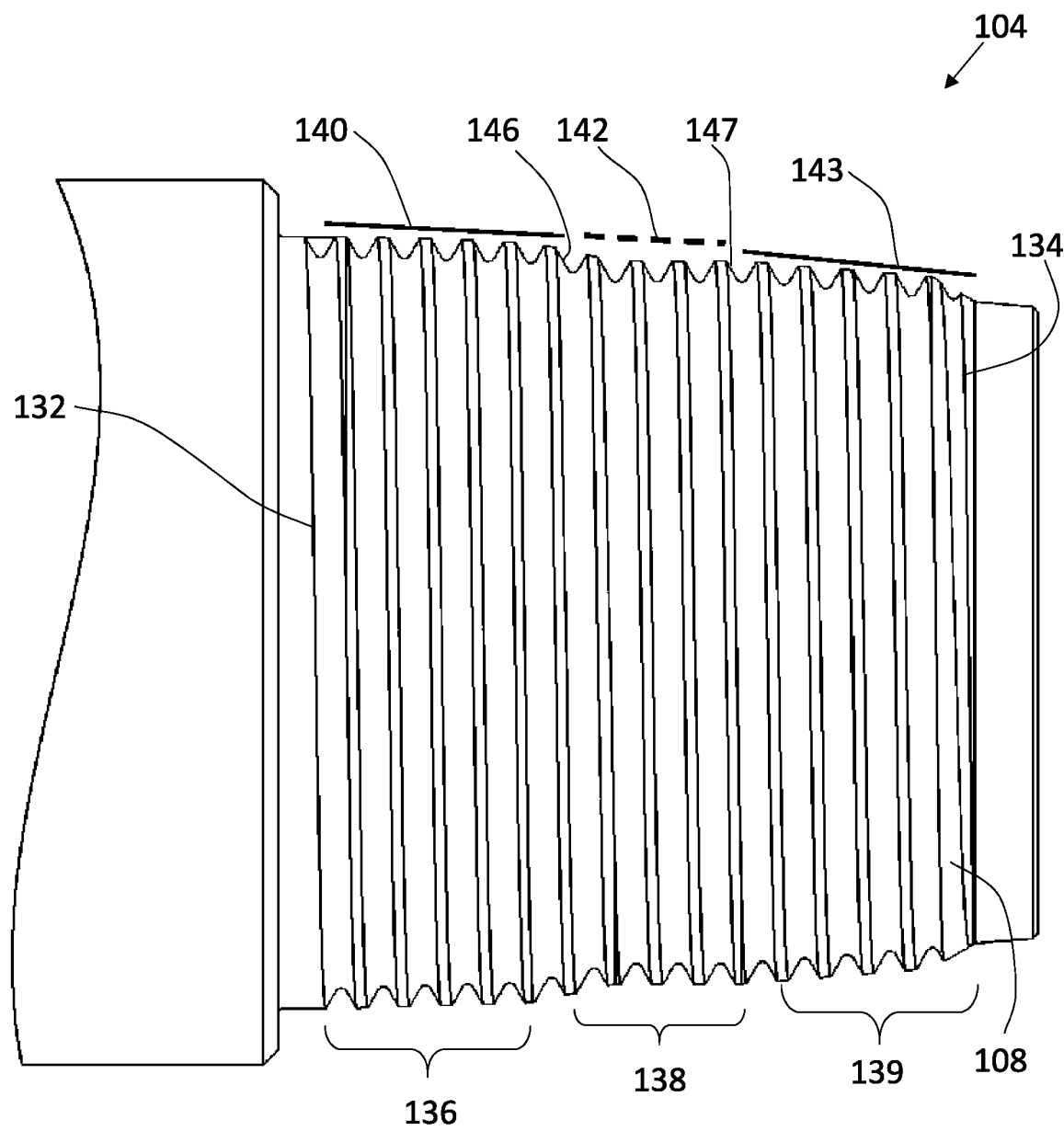
FIG. 13 is a side elevation view of a male connection end having a multiple tapered threaded profile, according to another aspect.
Figure 14:
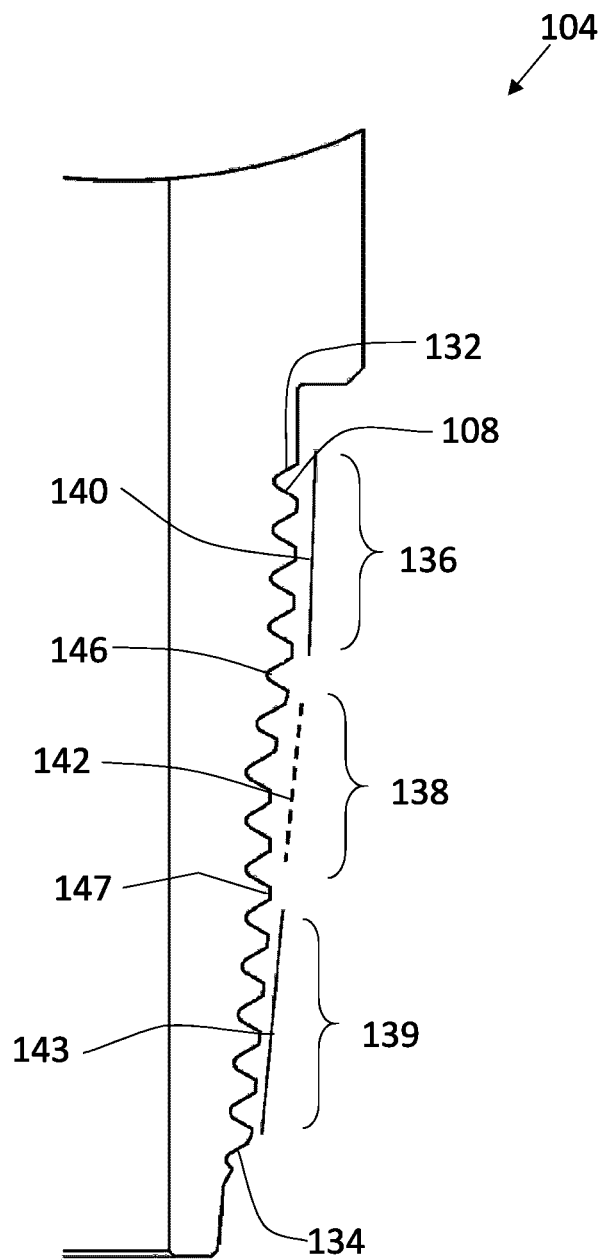
FIG. 14 is a partial side cross-sectional view of the male connection end shown in FIG. 13.
Figure 15:
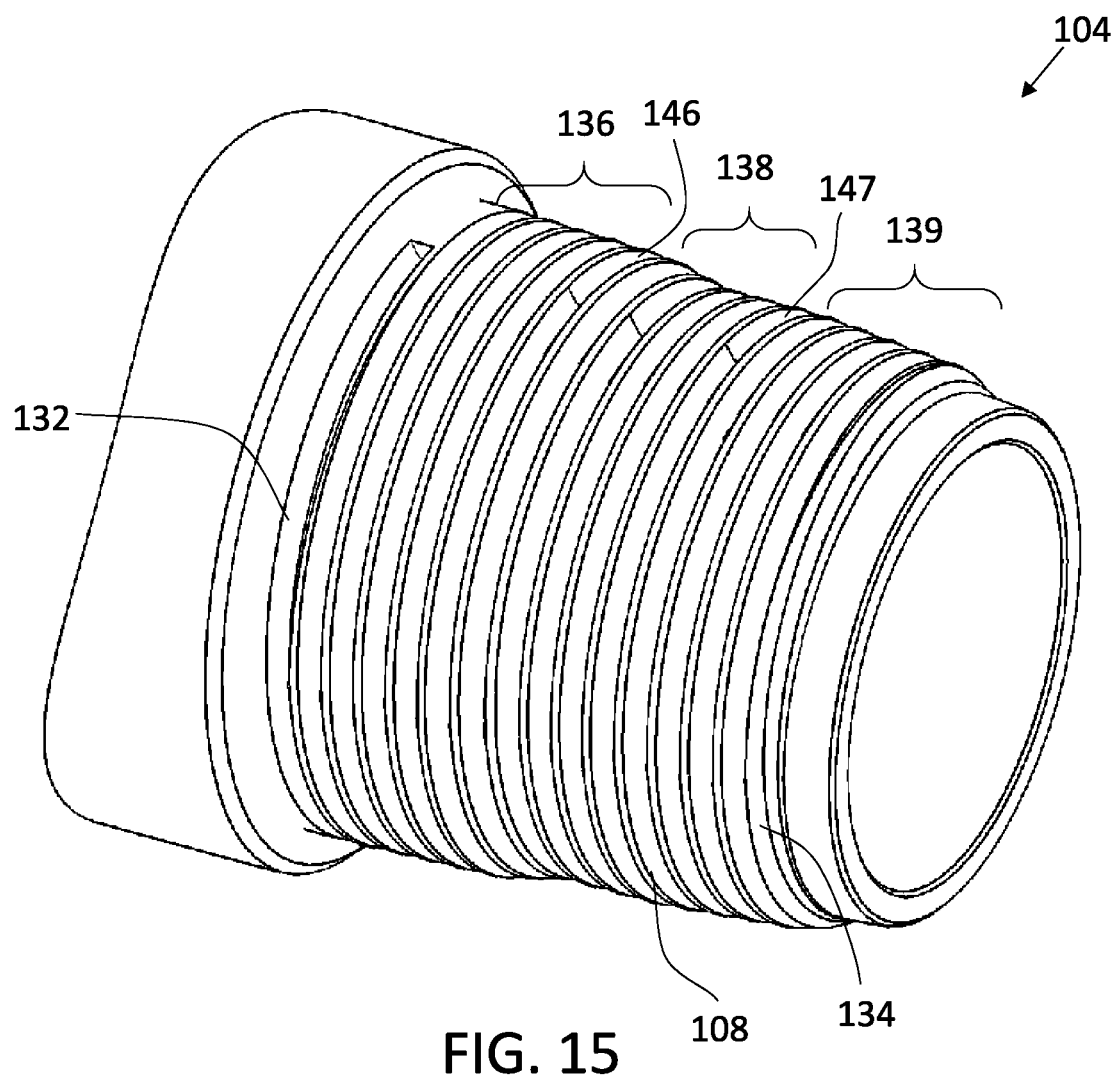
FIG. 15 is a perspective view of the male connection end shown in FIG. 13.
Figure 16:
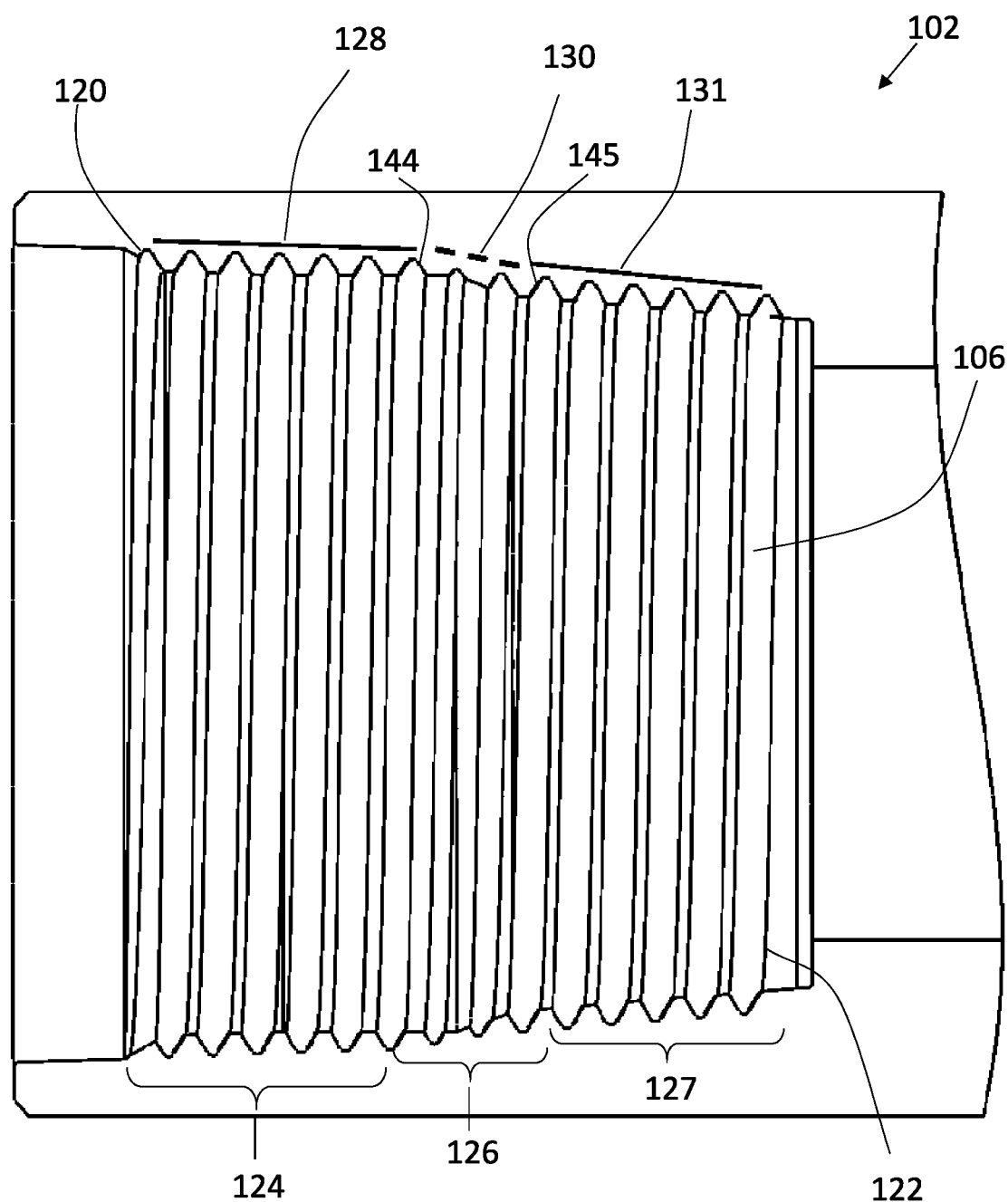
FIG. 16 is a side cross-sectional view of a female connection end having a multiple tapered threaded profile, according to another aspect.
Figure 17:
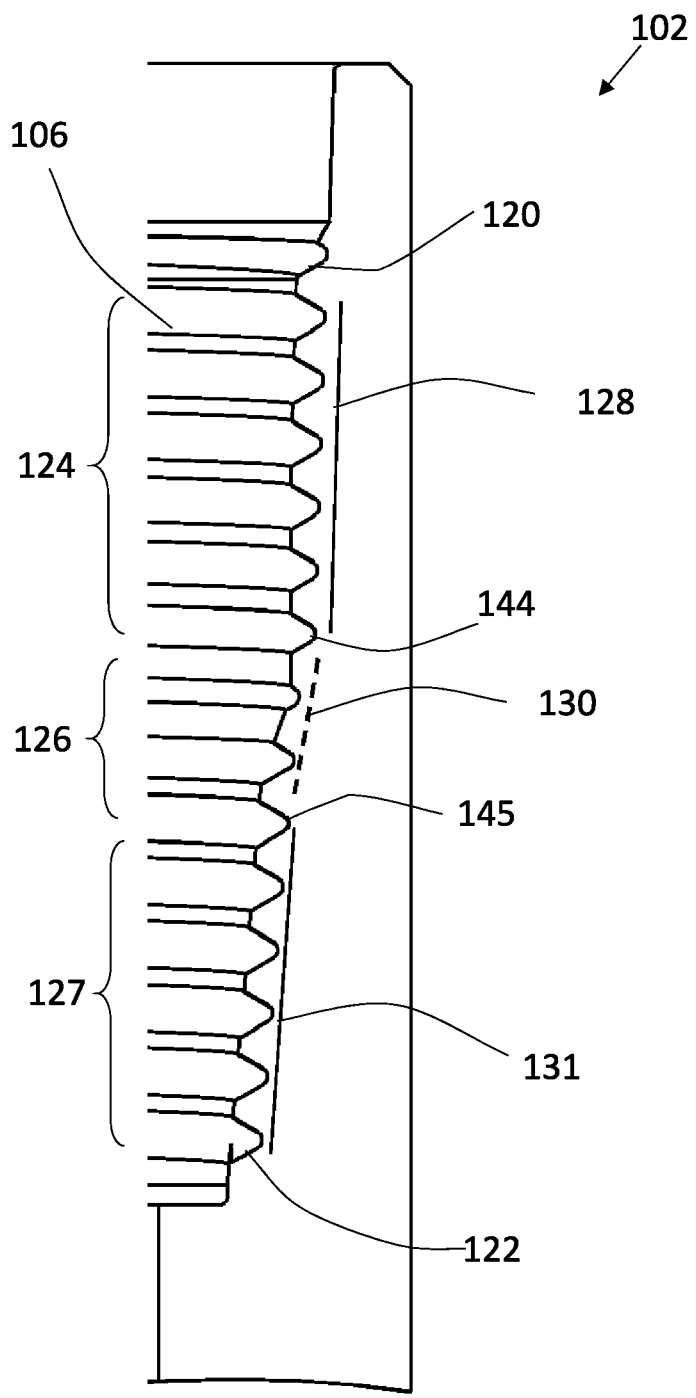
FIG. 17 is a partial, side cross-sectional view of the female connection end shown in FIG. 16.
Figure 18:
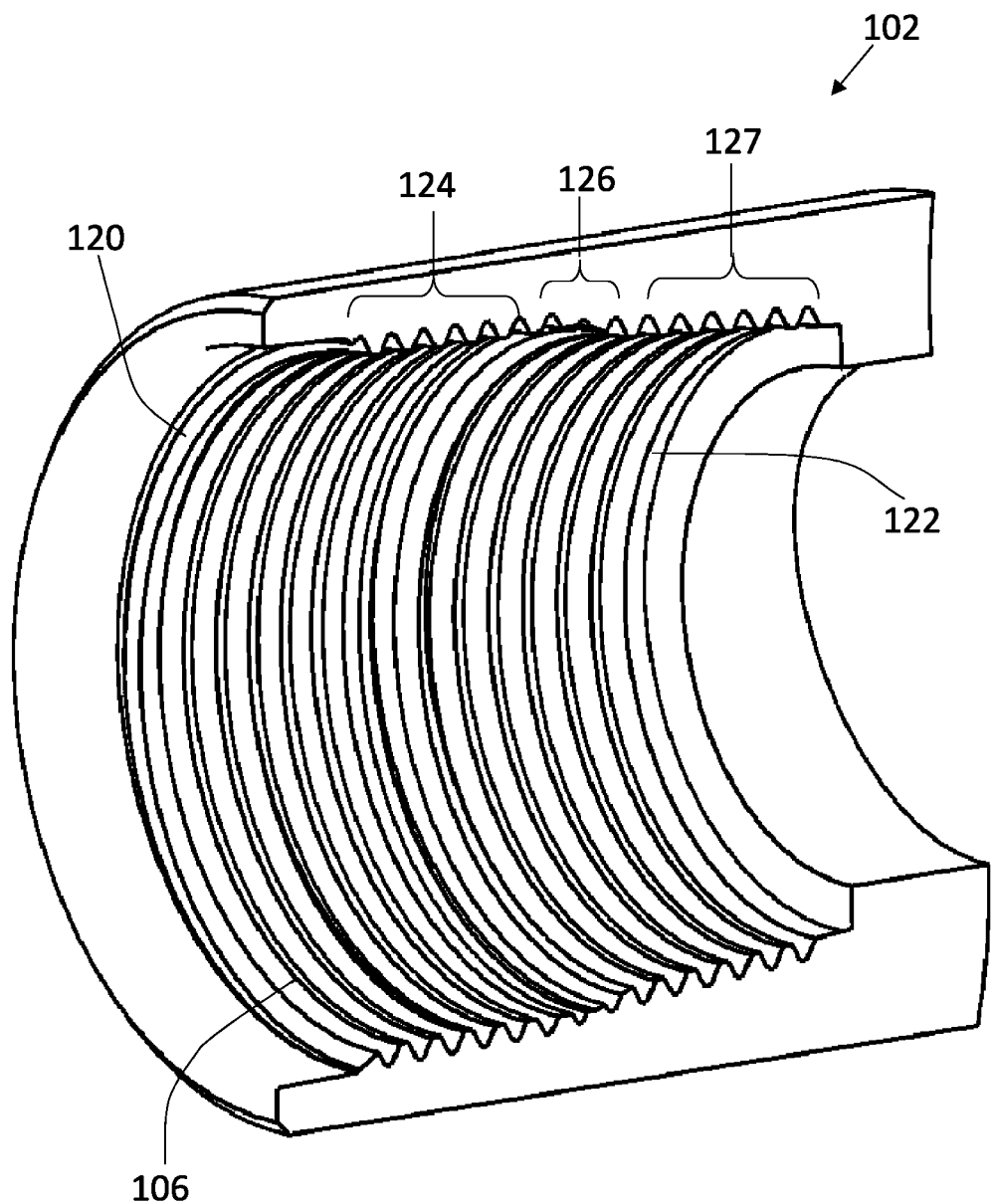
FIG. 18 is a perspective cross-sectional view of the female connection end shown in FIG. 16.
Figure 19:
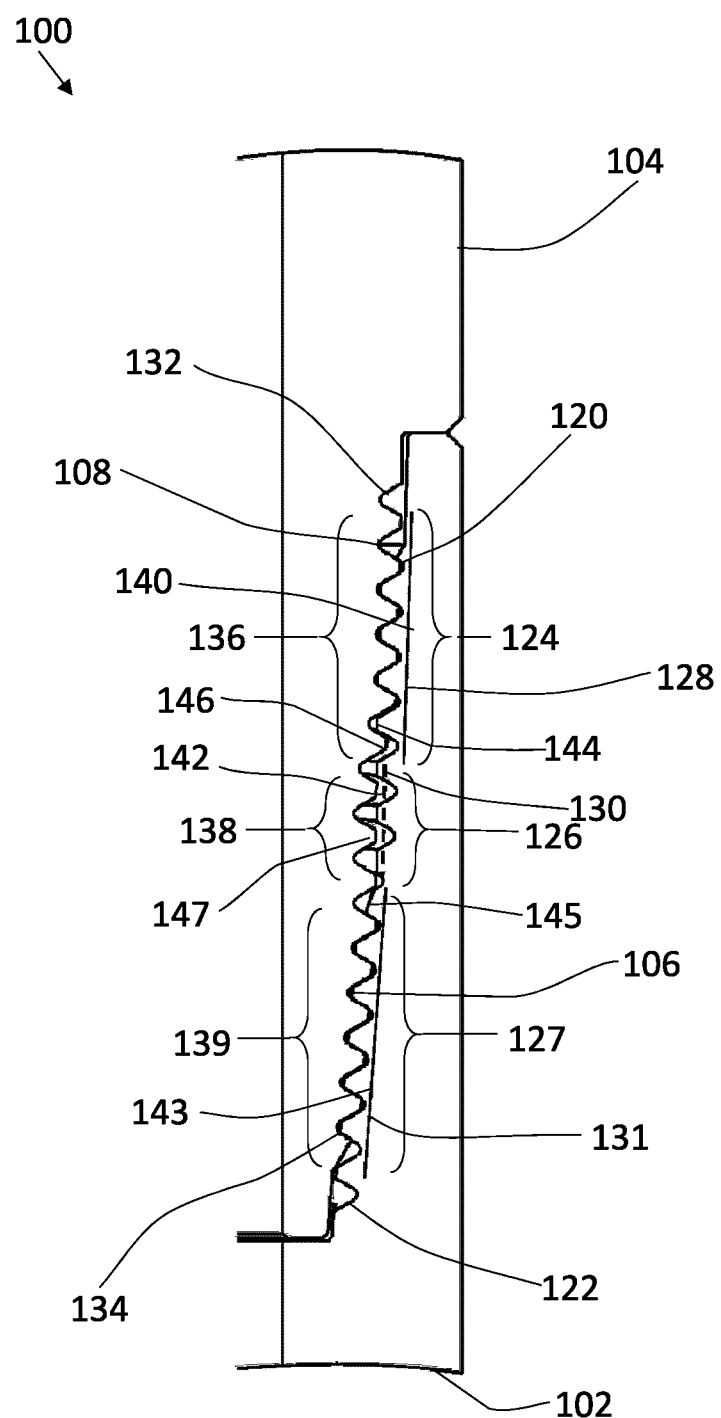
FIG. 19 is partial side cross-sectional view of a multiple tapered threaded connection comprising a male connection end in combination with a female connection end, according to another aspect.

Referring to FIG. 19, there is shown a multiple tapered threaded connection 100 having a female connection or box end 102 and a male connection or pin end 104. Referring to FIGS. 16 through 18, the female connection end 102 is provided with an internal thread 106. Referring to FIGS. 13 through 15, the male connection end 104 is provided with an external thread 108 that is complementary to and adapted to cooperate with the internal thread 106 of the female connection end 102. Referring to FIG. 16, internal thread 106 has a first end 120, a second end 122, a first portion 124, and a second portion 127 similar to what was described above. However, in the aspect illustrated in FIG. 16, the internal thread 106 is provided with a further, third portion 126. As shown, first portion 124 is located at first end 120 of internal thread 106 and has a first taper 128. Second portion 127 is located at second end 122 of internal thread 106 and has a second taper 131. The third portion 126 of the internal thread 106 is located between the first and second portions 124 and 127 and is provided with a third taper 130. In this aspect, the taper of each portion is different from that of the immediately adjacent portion. Thus, for example, the first taper 128 and second taper 131 are different from each other and the second taper 131 and third taper 130 are different from each other. It will be understood that, in other aspects of the description, the first and second tapers, 128 and 131 may be the same or different.

In the aspect of the description illustrated in FIGS. 16 and 17, each of first taper 128, second taper 131 and third taper 130 are different from each other. In the example illustrated, second taper 131 is steeper than third taper 130, and third taper 130 is steeper than first taper 128. As also shown, first portion 124, second portion 127 and third portion 126 may be of different lengths. However, it will be understood by persons skilled in the art that first portion 124, second portion 127 and third portion 126 may be of the same or different lengths. Thus, each of the portions may be of any length irrespective of the others.

Referring again to FIG. 13, male connection end 104 has external thread 108 having a first end 132, a second end 134, a first portion 136, a second portion 139 and a third portion 138. First portion 136, second portion 139 and third portion 138 of male connection end 104 correspond, respectively, to first portion 124, second portion 127 and third portion 126 of female connection end 102, shown in FIG. 16. As shown in FIG. 13, first portion 136 is adjacent first end 132 of external thread 108 and has a first taper 140, which corresponds to first taper 128 of female connection end 102. Second portion 139 is adjacent second end 134 of external thread 108 and has a second taper 143 that corresponds to second taper 131 of female connection end 102. As shown, third portion 138 is positioned between first portion 136 and second portion 139 and has a third taper 142 that corresponds to third taper 130 of female connection end 102.

As shown in FIGS. 13 and 14, each of first taper 140, second taper 143 and third taper 142 are different from each other. In the example illustrated, second taper 143 is steeper than third taper 142, and third taper 142 is steeper than first taper 140.

Figure 20:
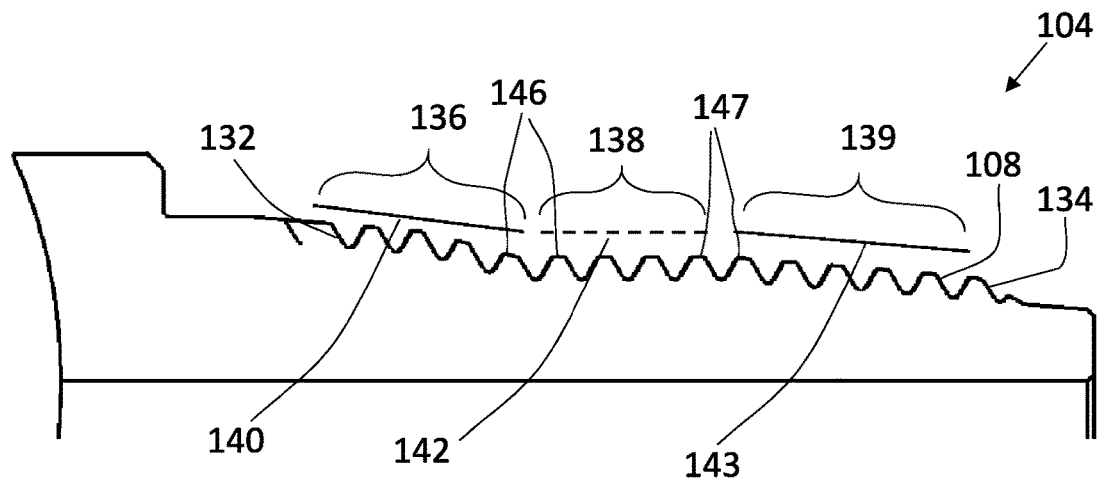
FIG. 20 is a partial side cross-sectional view of a male connection end having a multiple tapered threaded profile according to another aspect.
Figure 21:
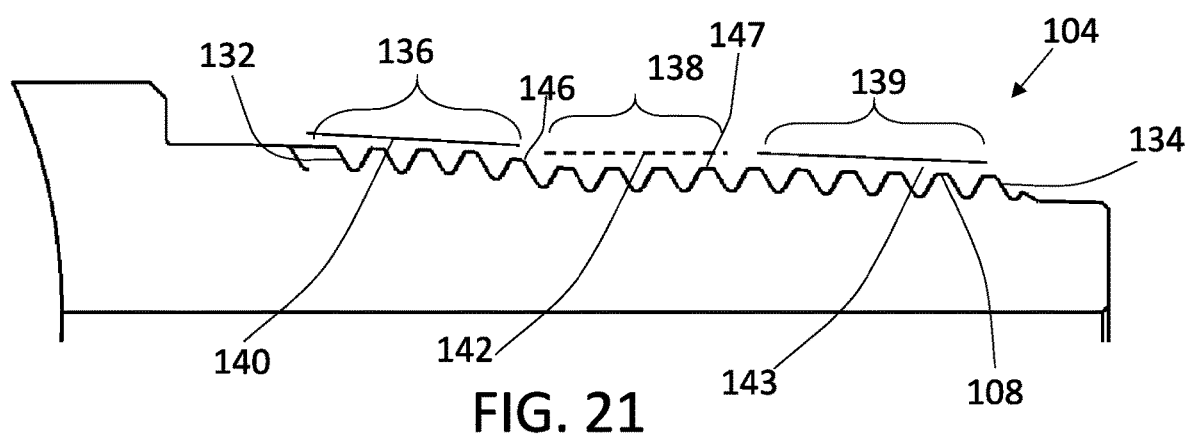
FIG. 21 is a partial side cross-sectional view of a male connection end having a multiple tapered threaded profile, according to another aspect.

In the example shown in FIGS. 20 and 21, the first taper 140 and second taper 143 are the same, while the third taper 142 is different from the first and second tapers 140, 143. In comparing the examples illustrated in FIGS. 20 and 21, it is noted that the first taper 140 and second taper 143 are each shown to be steeper in FIG. 20 than in the example shown in FIG. 21.

In the examples shown, first portion 136, second portion 139 and third portion 138 are illustrated as being of different lengths; however, it will be understood by persons skilled in the art that first portion 136, second portion 139 and third portion 138 may, independently, be of the same or different lengths.

Referring to FIG. 19, which illustrates a connection comprising a pin end 104 and a box end 102, the first tapers 128 and 140 create a connection that is relatively thick-walled, thereby allowing for maximizing torque capability in the higher stressed regions of the connection 100. Second tapers 131 and 143 and third tapers 130 and 142 have steeper tapers, thereby permitting deep stabbing in the lower stressed regions of the connection 100. As discussed above, this arrangement of tapers allows for a quick make-up and reduces damage without compromising the overall torque carrying capabilities of the connection 100.

It will be appreciated that the provision of the third taper, located between the first and second tapers, further enhances the tailored characteristics of the connection described herein.

In one example, and for illustration purposes only, the first tapers 128 and 140 may have a taper of 0.75 inches per foot while the third tapers 130 and 142 have a steeper taper of 1.25 inches per foot and the second tapers 131 and 143 have a further steeper taper of 2 inches per foot. The steeper taper of third tapers 130 and 142 and second tapers 131 and 143 allows for deeper stabbing of male connection end 104 into female connection end 102 while the shallower taper of first tapers 128 and 140 provides a thicker wall for each of male connection end 104 and female connection end 102. By providing different tapers, the stress distribution within the connection may be altered or adjusted as needed for a particular application. Thus, by providing different tapers, the stress distribution within the connection may be altered in any desirable fashion.

Referring to FIG. 17, it is noted that a transitional thread 144 may optionally be provided so as to form a junction between the thread of the first taper 128 and the third taper 130, thereby allowing the internal thread 106 to be continuous across the first and third portions 124 and 126. Similarly, a transitional thread 145 may be provided to connect the threads of second taper 131 and the third taper 130, so as to allow internal thread 106 to remain continuous across the third and second portions 126 and 127. Generally, the transitional threads 144 and 145 may comprise two to four thread rotations; however, it will be understood by persons skilled in the art that more or fewer transitional thread rotations may be provided. The number of transitional thread 144 and 145 rotations can vary based upon the diameter of the connection, the connection length, and the pitch of the threads.

In a similar manner to above, and referring to FIG. 14, a transitional thread 146 may be provided to connect the thread of first taper 140 with the thread of third taper 142 to maintain external thread 108 continuous across the first and third portions 136 and 138. A transitional thread 147 connects the threads of the third taper 142 and the second taper 143, thereby allowing external thread 108 to be continuous across third and second portions 138 and 139. Generally, the transitional threads 146 and 147 may comprise two to four thread rotations; however, it will be understood by persons skilled in the art that more or fewer transitional thread rotations may be provided. The number of transitional thread 146 and 147 rotations can vary based upon the diameter of the connection, the connection length, and the pitch of the threads. In the event that more transitional thread rotations are required in one or more locations, the threads of the third portion 126 may act as a transitional thread between first portion 124 and second portion 127 and the threads of third portion 138 may act as a transitional thread between first portion 136 and second portion 139.

As shown in the example illustrated in FIG. 19, the transitional threads 144, 145, 146 and 147 may be stubbed or shortened. As described above, transitional threads 144, 145, 146 and 147 would generally bear the brunt of the stabbing damage. Thus, by stubbing the transitional threads, it is possible to restrict damage to the transitional threads 144, 145, 146 and 147 and to mitigate damage to internal thread 106 and external thread 108.

Figure 22:
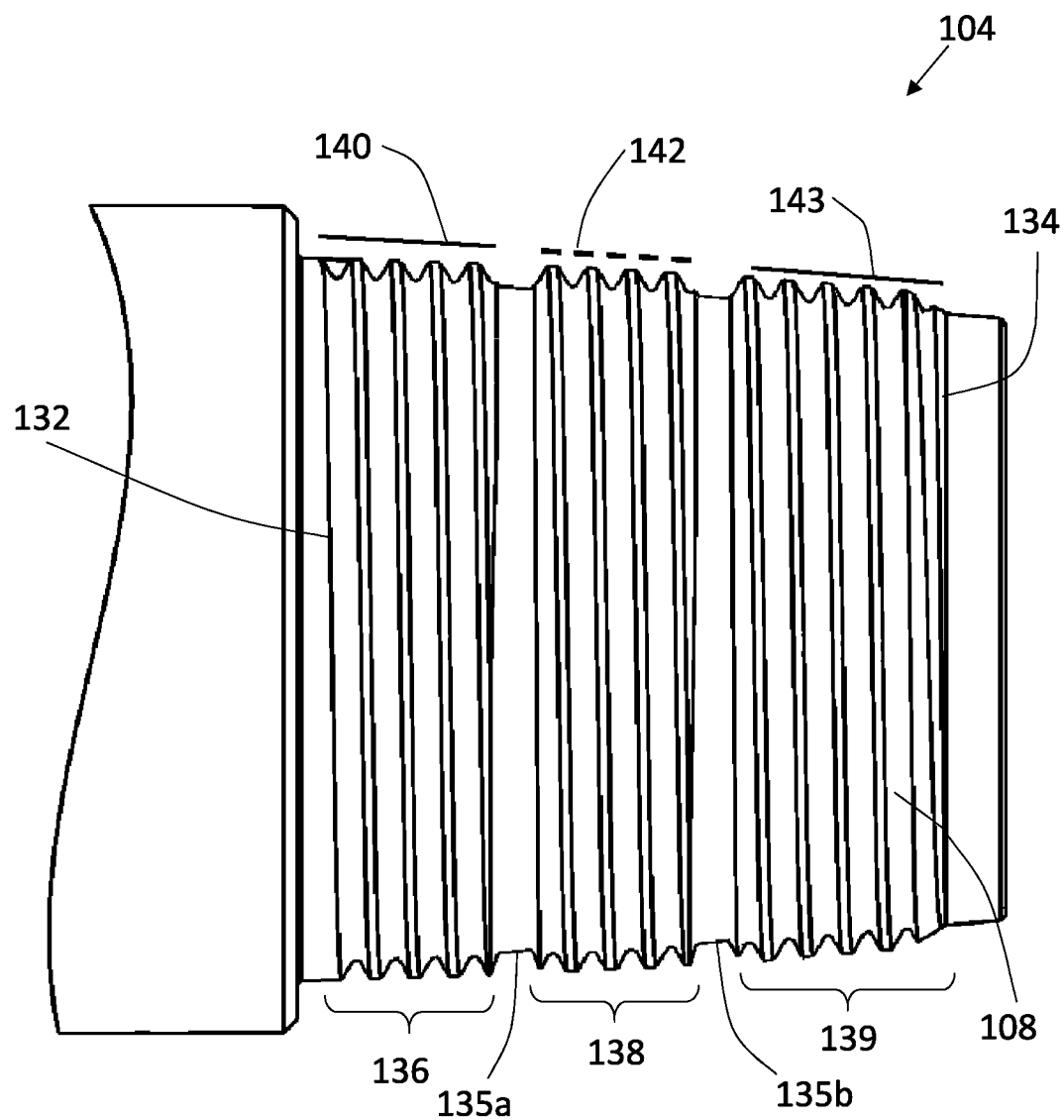
FIG. 22 is a side elevation view of a male connection end having a multiple tapered threaded profile, according to another aspect.

Referring to FIG. 22, illustrating the pin end 104, the first portion 136, with first taper 140, and the third portion 138, with third taper 142, of external thread 108 may be spaced apart from each other by a first spacer segment 135a. Similarly, the third portion 138, with third taper 142, and second portion 139, with second taper 143, of external thread 108 may be spaced apart from each other by a second spacer segment 135b. As shown in FIG. 22, the external thread 108 is not continuous. The sizes, or lengths, of the spacer segments 135a and 135b may be the same or may vary.

Figure 23:
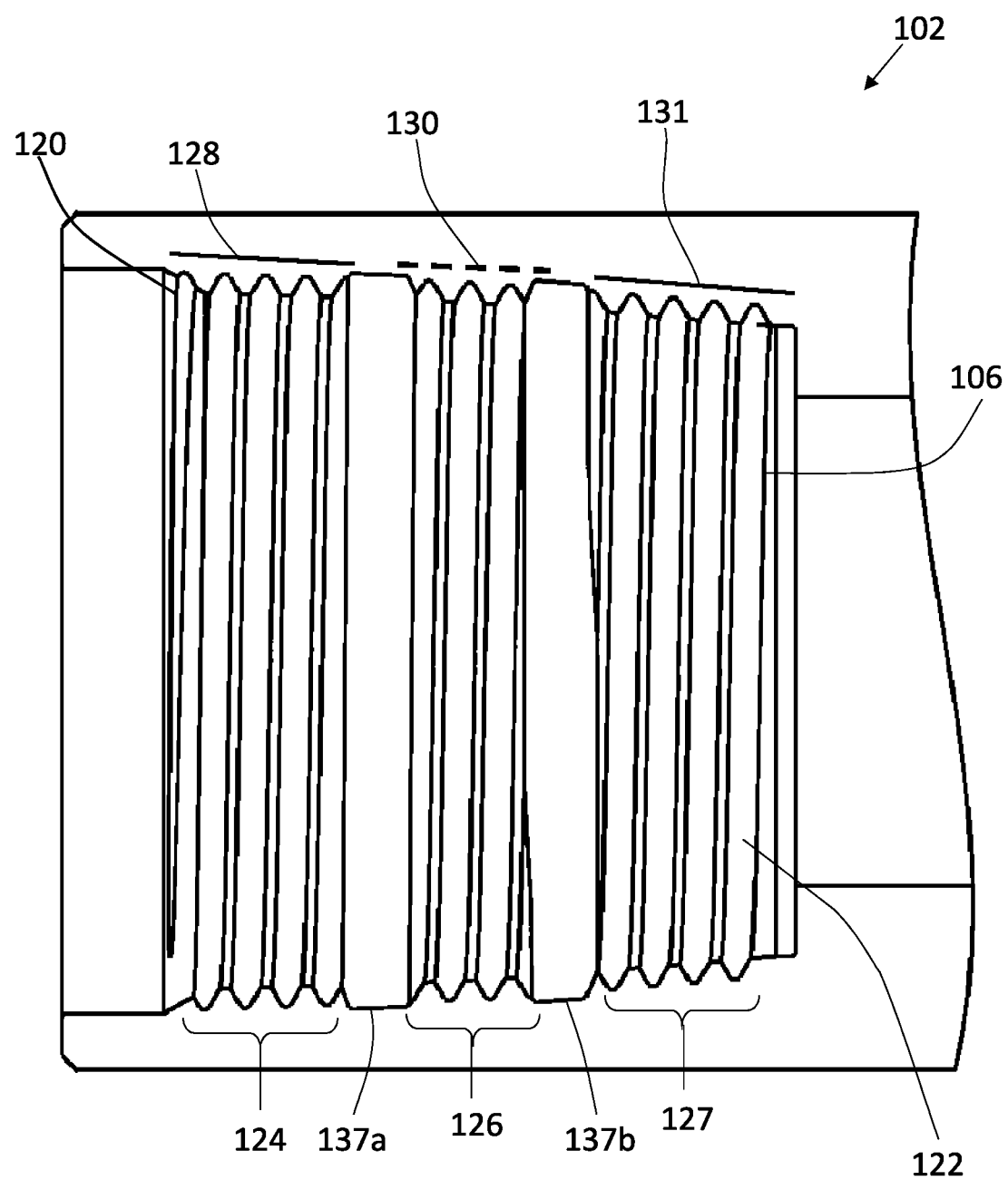
FIG. 23 is a side elevation view of a female connection end having a multiple tapered threaded profile, according to another aspect.

In a similar manner, referring to FIG. 23, illustrating the box end 102, the first portion 124, with first taper 128, and third portion 126, with third taper 130, of internal thread 106 may be spaced apart from each other by a first spacer segment 137a. Similarly, the third portion 126, with third taper 130, and the second portion 127, with second taper 131, of internal thread 106 may be spaced apart from each other by a second spacer segment 137b. Thus, in this way, the internal thread 106 is not continuous. The sizes, or lengths, of the spacer segments 137a and 137b may be the same or may vary.

A variation of the multiple tapered threaded connection will now be described with reference to FIG. 24. As shown, the multiple tapered threaded connection generally identified by reference numeral 200 is formed by connecting a female connection or box end 212 and a male connection or pin end 214. Female connection end 212 has an internal thread 216 and male connection end 214 has an external thread 218, which is adapted to cooperate with the internal thread 216 of the box end 212. The internal thread 216 has a first end 220, a second end 222, a first portion 224 and a second portion 226. First portion 224 is adjacent first end 220 of internal thread 216 and has a first taper shown at 228. Second portion 226 is adjacent second end 222 of internal thread 216 and has a second taper shown at 230. In the example shown, first portion 224 and second portion 226 are of substantially of the same length; however, it will be understood by persons skilled in the art that the first and second portions 224, 226 may be different lengths. In the example shown, the second taper 230 is steeper than first taper 228.

Figure 24:
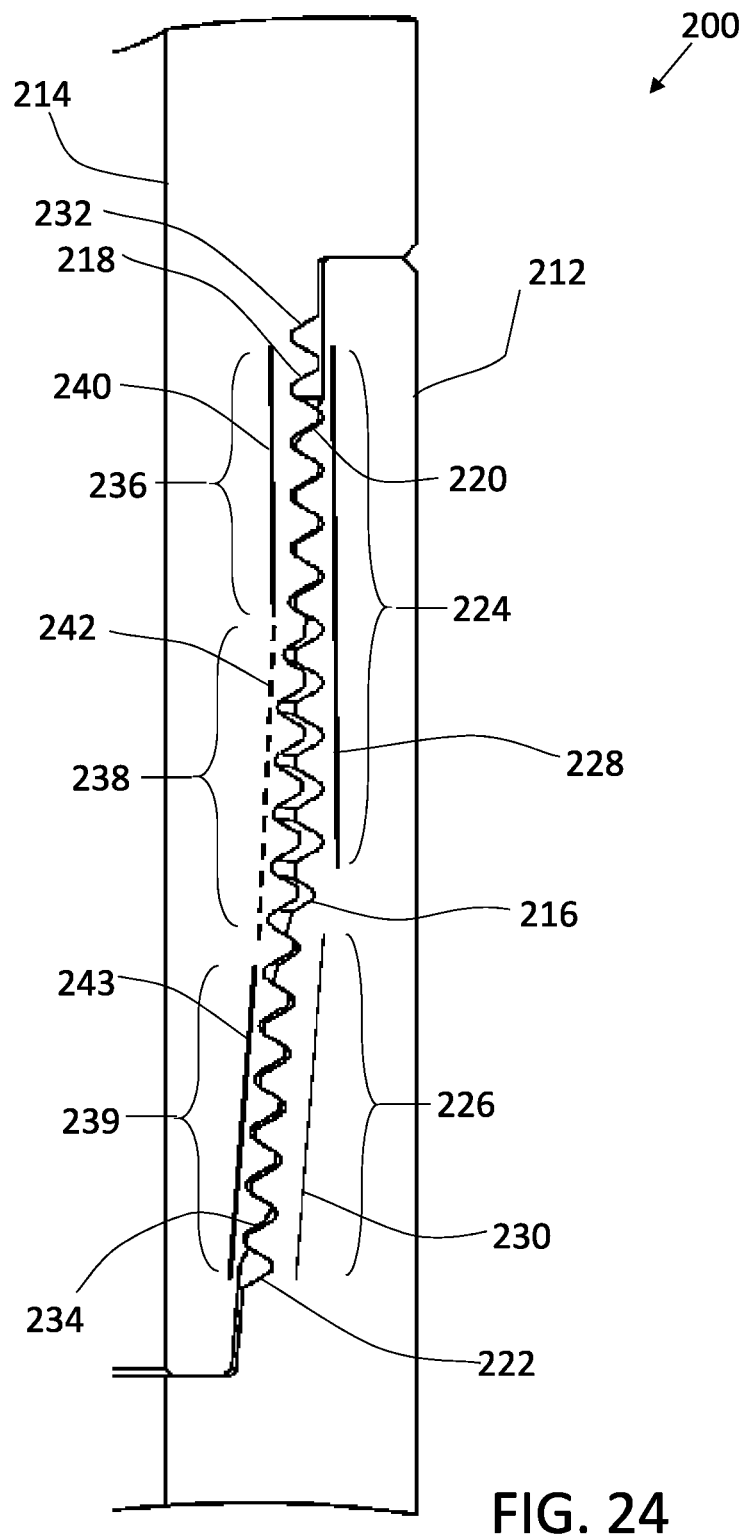
FIG. 24 is a partial side cross-sectional view of a multiple tapered threaded connection, comprising male and female connection ends, according to another aspect.

Referring to FIG. 24, male connection end 214 has an external thread 218 having a first end 232, a second end 234, a first portion 236, a second portion 239 and a third portion 238. In the embodiment shown, first portion 236 is adjacent first end 232 of external threads 218 and has a first taper shown at 240 corresponding to first taper 228 of female connection end 212. Second portion 239 is adjacent second end 234 of external threads 218 and has a second taper shown at 243 that corresponds to second taper 230 of female connection end 212. Third portion 238 is positioned between first portion 236 and second portion 239 and has a third taper shown at 242. In the example shown, the third taper 242 is designed to not cooperate with either the first taper 228 or second taper 230 of female connection end 212. In the embodiment shown, first portion 236 of male connection end 214 corresponds to a portion of the first portion 224 of female connection end 212 and the second portion 239 of male connection end 214 corresponds to the second portion 226 of female connection end 212. As would be understood, the phrase "corresponds to" as used herein is intended to indicate that the respective threads cooperate with each other when the box and pin ends are connected.

The third portion 238 of male connection end 214 does not cooperate with either the first portion 224 or the second portion 226 of female connection end 212 and there is, therefore, no threaded connection between external thread 218 and internal threads 216 at the region of the third portion 238 of male connection end 214.

It will be understood by persons skilled in the art that any combination of corresponding portions between male connection end 214 and female connection end 212 may be provided for. In the example shown, each of first taper 240, third taper 242 and second taper 243 are different from each other, wherein the second taper 243 is steeper than third taper 242, and the third taper 242 is steeper than first taper 240. As also shown by way of example in FIG. 24, the first portion 236, second portion 239 and third portion 238 may be of different lengths; however, it will be understood by persons skilled in the art that these portions may be of the same or different lengths.

A further variation of the multiple tapered threaded connection, generally identified by reference numeral 300, will now be described with reference to FIG. 25.

Figure 25:
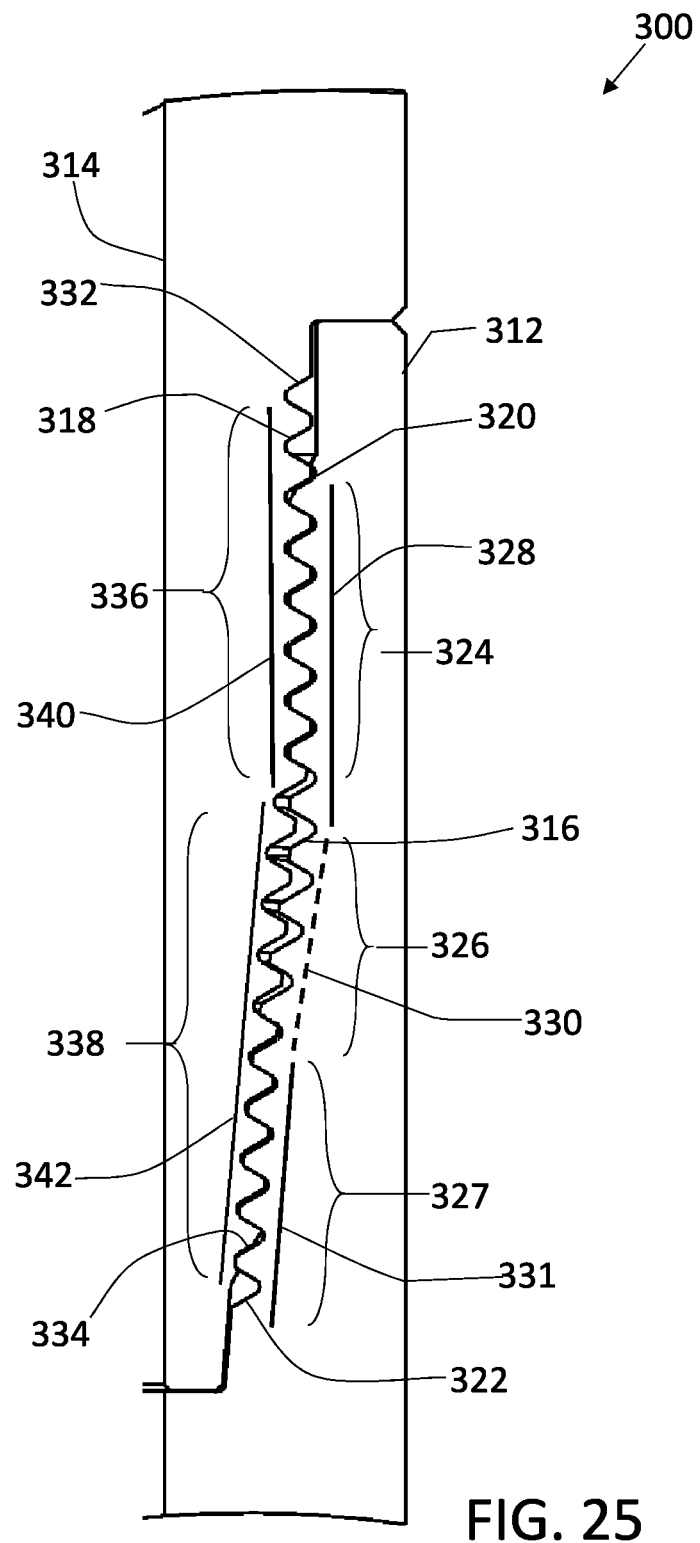
FIG. 25 is a partial side cross-sectional view of a multiple tapered threaded connection, comprising male and female connection ends, according to another aspect.

Referring to FIG. 25, a multiple tapered threaded connection 300 has a female connection, or box end 312, and a male connection, or pin end 314. Female connection end 312 has an internal thread 316 and male connection end 314 has an external thread 318. Internal thread 316 has a first end 320, a second end 322, a first portion 324, a second portion 327 and a third portion 326. First portion 324 is adjacent first end 320 of internal threads 316 and has a first taper shown at 328. Second portion 327 is adjacent second end 322 of internal thread 316 and has a second taper shown at 331. Third portion 326 is positioned between first portion 324 and second portion 327 and has a third taper shown at 330. The taper of a given portion is different from the taper of the adjacent portion. Thus, first taper 328 and third taper 330 are different from each other, and third taper 330 and second taper 331 are different from each other.

In the example shown in FIG. 25, each of first taper 328, third taper 330 and second taper 331 are different from each other. In this example, second taper 331 is steeper than third taper 330, and third taper 330 is steeper than first taper 328.

In the example shown in FIG. 25, first portion 324, third portion 326 and second portion 327 are of different lengths; however, it will be understood by persons skilled in the art that these portions may be of the same or different lengths.

As also illustrated in FIG. 25, male connection end 314 has an external thread 318 that has a first end 332, a second end 334, a first portion 336 and a second portion 338. First portion 336 is adjacent first end 332 of external thread 318 and has a first taper shown at 340. Second portion 338 is adjacent second end 334 of external threads 318 and has a second taper shown at 342. As shown, the first taper 340 of first portion 336 of external thread 318 generally corresponds to the first taper 328 of female connection end 312. Similarly, second taper 342 of second portion 338 of external thread 318 generally corresponds to the second taper 331 of female connection end 312. Third taper 330 of third portion 326 of female connection end 312 does not cooperate with either the first taper 340 or the second taper 342 of male connection end 314. In the example shown, a portion of the first portion 336 of male connection end 314 cooperates with the first portion 324 of female connection end 312, and the second portion 338 of male connection end 314 cooperates with the second portion 327 of female connection end 312. The third portion 326 of female connection end 312 does not cooperate with either the first portion 336 or second portion 338 of male connection end 314 and there is, therefore, no threaded connection between external thread 318 and internal threads 316 at the region of the third portion 326 of female connection end 312.

It will be understood by persons skilled in the art that any combination of corresponding portions between male connection end 314 and female connection end 312 may occur. In the examples illustrated, first portion 336 and second portion 338 are substantially of the same length; however, it will be understood by persons skilled in the art that the first and second portions 336 and 338 may be of different lengths. In the example shown, second taper 342 is steeper than first taper 340; however, this will be understood to be an illustrative embodiment only and not limiting the of scope of the description.

In the present description, the male and/or female connection ends have been described primarily with respect to tubulars or tubular members. However, as mentioned above, a drill string may, in addition to tubular members, also include any number of other components, such as tools, subs etc., as may be needed for a particular application. It will therefore be understood that the connection ends described herein may be provided on any drill string component and not only on tubulars.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A plurality of connectors for connecting first and second drill string components, the drill string connectors comprising:
   a first connector provided on a first end of the first drill string component and a second connector provided on a first end of the second drill string component, the first connector being adapted to receive the second connector;
   the first connector having a first portion located proximal to the first end of the first drill string component and a second portion located away from the first end and within the lumen of the first drill string component, the first connector having at least one internal thread;
   the second connector having a first portion located away from the first end of the second drill string component and a second portion located proximal to the first end of the second drill string component, the second connector having at least one external thread, wherein the at least one internal thread is adapted to cooperate with the at least one external thread to form a threaded connection when the first connector receives the second connector, wherein, once connected, the first portion of the second connector is adjacent the first portion of the first connector;
   the first portion of the first connector having a first taper and the first portion of the second connector having a corresponding first taper; and,
   the second portion of the first connector having a second taper different from the first taper and the second portion of the second connector having a corresponding second taper,
   wherein the second taper of the first connector is steeper than the first taper thereof, and
   wherein the at least one internal thread of the first connector comprises a first internal thread provided on the first portion thereof and a second internal thread provided on the second portion thereof.

2. The connectors of claim 1, wherein the first taper is about 0.75 inches per foot.

3. The connectors of claim 1, wherein the second taper is about 1.5 to about 2 inches per foot.

4. The connectors of claim 1, wherein the at least one internal thread of the first connector is continuous and extends over the first portion and the second portion thereof.

5. The connectors of claim 1, wherein the at least one external thread of the second connector is continuous and extends over the first portion and the second portion thereof.

6. The connectors of claim 1, wherein the external thread of the second connector comprises a first external thread provided on the first portion thereof and a second external thread provided on the second portion thereof, and wherein at least a portion of the first external thread is adapted to cooperate with a portion of the first internal thread and wherein at least a portion of the second external thread is adapted to cooperate with a portion of the second internal thread.

7. The connectors of claim 6, wherein the first connector further comprises an internal transition thread provided between the first and second internal threads and wherein the second connector further comprises an external transition thread provided between the first and second external threads.

8. The connectors of claim 7, wherein at least one of the internal and external transition threads are stubbed.

9. The connectors of claim 6, wherein:
   the first connector includes at least one female spacer segment for dividing the at least one internal thread into two or more sections;
   the second connector includes at least one corresponding male spacer segment for dividing the at least one external thread into two or more segments; and
   the at least one male spacer segment is adapted to overlap the at least one female spacer segment when the connection is formed.

10. The connectors of claim 1, wherein at least one of the first connector or the second connector includes a third portion located between the first portion and second portion thereof.

11. The connectors of claim 10, wherein the third portion has a third taper that is different from the first and second tapers of the adjacent first and second portions.

12. The connectors of claim 1, wherein:
    the first connector includes a third portion located between the first portion and second portion thereof;
    the second connector includes a third portion located between the first portion and second portion thereof; and,
    the third portion of the second connector is adapted to overlap the third portion of the first connector when the connection is formed.

13. The connectors of claim 12, wherein the third portion of the first connector has a taper and wherein the third portion of the second connector has a corresponding taper.

14. The connectors of claim 13, wherein the taper of the third portion of the first connector is different from the taper of the first portion and the second portion thereof.

15. The connectors of claim 14, wherein the tapers of the first, second and third portions of the first connector are different from each other.

16. The connectors of claim 14, wherein:
    the first connector is provided with a first internal transition thread between the first and third portions thereof and a second internal transition thread between the third and second portions thereof; and,
    the second connector is provided with a first external transition thread between the first and third portions thereof and a second external transition thread between the third and second portions thereof.

17. The connectors of claim 1, wherein at least one of the drill string components is a drill string tubular, a drill string tool, and/or a coupling.

18. The connectors of claim 1, wherein the ratio of the second taper to the first taper is from about 2:1 to about 3:1.

19. The connectors of claim 1, wherein the connectors are provided on the ends of their respective drill string components by coupling them to their respective drill string components or by integrally forming them with their respective drill string components.

20. A drill string component comprising a female connector provided on a first end thereof, the female connector being adapted to receive a corresponding male connector provided on another drill string component, the female connector comprising:
    a first portion located proximal to the first end of the drill string component;
    a second portion located away from the first end and within the lumen of the drill string component;
    at least one thread provided on the first and second portions, wherein the at least one thread is an internal thread adapted to cooperate with at least one external thread of the male connector to form a threaded connection when the female connector receives the male connector;

the first portion of the female connector having a first taper; and the second portion of the female connector having a second taper, wherein the second taper is steeper than the first taper, and wherein the at least one thread comprises a first internal thread provided on the first portion and a second internal thread provided on the second portion.

21. A drill string component comprising a male connector provided on a first end thereof, the male connector being adapted to be received in a corresponding female connector provided on another drill string component, the male connector comprising:

a first portion located away from the first end of the drill string component;

a second portion located proximal to the first end of the drill string component;

at least one thread provided on the first and second portions, wherein the at least one thread is an external thread adapted to cooperate with at least one internal thread of the female connector to form a threaded connection when the female connector receives the male connector;

the first portion of the male connector having a first taper; and, the second portion of the male connector having a second taper, wherein the second taper is steeper than the first taper, and wherein the at least one thread comprises a first external thread provided on the first portion and a second external thread provided on the second portion.

22. A method of coupling a first drill string component with a second drill string component, the method comprising:

providing a first connector on a first end of the first drill string component and providing a second connector on a first end of the second drill string component, the first connector having at least one internal thread and the second connector having at least one external thread, each of the first and second connectors having a plurality of corresponding tapered portions, wherein for each connector a second taper of a second portion is steeper than a first taper of a first portion, wherein the at least one internal thread comprises a first internal thread provided on the first portion and a second internal thread provided on the second portion, and wherein the at least one external thread comprises a first external thread provided on the first portion and a second external thread provided on the second portion;

positioning the first connector so that the first portion of the first connector is located proximal to the first end of the first drill string component and the second portion of the first connector is located away from the first end and within the lumen of the first drill string component;

positioning the second connector so that the first portion of the second connector is located away from the first end of the second drill string component and the second portion of the second connector is located proximal to the first end of the second drill string component; and advancing the second connector into the first connector so that the first internal thread of the first connector cooperates with the first external thread of the second connector and the second internal thread of the first connector cooperates with the second external thread of the second connector to form a threaded connection and the first portion of the second connector is received adjacent the first portion of the first connector.

\* \* \* \* \*